(12) United States Patent
Pennam et al.

(10) Patent No.: US 11,139,916 B2
(45) Date of Patent: Oct. 5, 2021

(54) REDUCED POWER TRANSMITTER DURING STANDBY MODE

(71) Applicant: TEXAS INSTRUMENTS INCORPORATED, Dallas, TX (US)

(72) Inventors: Sanjay Pennam, Visakhapatnam (IN); Vamsi Krishna Kandalla, Bengaluru (IN); Brahmendra Reddy Yatham, Bengaluru (IN); Shailesh Wardhen, Bengaluru (IN); Jaiganesh Balakrishnan, Bengaluru (IN); Jawaharlal Tangudu, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/936,065

(22) Filed: Jul. 22, 2020

(65) Prior Publication Data
US 2021/0176005 A1 Jun. 10, 2021

(30) Foreign Application Priority Data

Dec. 5, 2019 (IN) .............................. 201941050103

(51) Int. Cl.
*H04L 1/00* (2006.01)
*H04B 1/04* (2006.01)
(52) U.S. Cl.
CPC ............ *H04L 1/0044* (2013.01); *H04B 1/04* (2013.01); *H04L 1/0042* (2013.01); *H04L 1/0047* (2013.01); *H04L 1/0061* (2013.01)
(58) Field of Classification Search
CPC ....... H03K 5/1508; H04L 7/02; H04L 1/0044; H04L 1/0042; H04L 1/0061; H04L 1/0047; H04L 1/0059; H04L 1/00; H04B 1/04

USPC .......................................................... 375/295
See application file for complete search history.

(56) References Cited

U.S. PATENT DOCUMENTS

| 7,240,208 | B1 * | 7/2007 | Oakley | H04L 9/0897 |
| | | | | 348/207.99 |
| 2006/0018254 | A1 | 1/2006 | Sanders et al. | |
| 2008/0155134 | A1 * | 6/2008 | Mulligan | G06F 1/3203 |
| | | | | 710/20 |
| 2018/0054214 | A1 * | 2/2018 | Takahashi | H03M 5/14 |
| 2018/0102779 | A1 * | 4/2018 | Behel | H03L 7/0814 |

(Continued)

OTHER PUBLICATIONS

International Search Report in corresponding PCT Application No. PCT/IB2020/001070, dated May 13, 2021 (2 pages).

*Primary Examiner* — Leila Malek
(74) *Attorney, Agent, or Firm* — John R. Pessetto; Charles A. Brill; Frank D. Cimino

(57) ABSTRACT

A transmitter includes a data stream encoder layer having an output and a pattern generator having a bit pattern output. The transmitter further includes a first multiplexer having first and second inputs and a first multiplexer output. The first input is coupled to the output of the data stream encoder layer, and the second input is coupled to the bit pattern output of the pattern generator. While at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer.

25 Claims, 22 Drawing Sheets

(56) References Cited

U.S. PATENT DOCUMENTS

2018/0152333 A1 5/2018 Shellhammer et al.
2018/0242248 A1 8/2018 Huang et al.

* cited by examiner

| DX.Y | Y HGF | X EDCBA | CURRENT RD = 0 abcdei_fghj | CURRENT RD = 1 abcdei_fghj | RD |
|---|---|---|---|---|---|
| D0.0 | 000 | 00000 | 100111_0100 | 011000_1011 | SAME |
| D1.0 | 000 | 00001 | 011101_0100 | 100010_1011 | SAME |
| D2.0 | 000 | 00010 | 101101_0100 | 010010_1011 | SAME |
| D3.0 | 000 | 00011 | 110001_1011 | 110001_0100 | FLIP |
| D4.0 | 000 | 00100 | 110101_0100 | 001010_1011 | SAME |
| D5.0 | 000 | 00101 | 101001_1011 | 101001_0100 | FLIP |

REDUCED POWER TRANSMITTER DURING STANDBY MODE

CROSS-REFERENCE TO RELATED APPLICATIONS

This application claims priority to India Provisional Application No. 201941050103, filed Dec. 5, 2019, which is hereby incorporated by reference.

BACKGROUND

Many types of systems include a transmitter that sends data to a receiver. Due to intermittent use of the communication link between transmitter and receiver, or for other reasons, some transmitter/receiver systems permit the transmitter to be in a standby mode. During the standby mode, at least some of the internal circuitry of the transmitter is powered off to thereby save power. Powering down a transmitter may be advantageous to save power, but may result in decoding errors at the receiver, and the communication link may need to be re-established when the transmitter is powered up from the standby mode.

SUMMARY

In at least one example, a transmitter includes a data stream encoder layer having an output and a pattern generator having a bit pattern output. The transmitter further includes a first multiplexer having first and second inputs and a first multiplexer output. The first input is coupled to the output of the data stream encoder layer, and the second input is coupled to the bit pattern output of the pattern generator. While at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer.

In at least one other example, a method includes activating a pattern generator and providing a control parameter from a data stream encoder layer of a transmitter to the pattern generator. The method further includes powering down the transmitter's data stream encoder layer, generating, by the pattern generator, a first bit pattern based, at least in part, on the control parameter provided from the data stream encoder layer, and further providing the first bit patterns from the pattern generator through a serializer of the transmitter while the transmitter's data stream encoder layer is in a standby mode.

BRIEF DESCRIPTION OF THE DRAWINGS

For a detailed description of various examples, reference will now be made to the accompanying drawings in which.

DETAILED DESCRIPTION

The disclosed examples are directed to a transmitter that is powered down during a standby mode but for which the communication link between the transmitter and a receiver can remain active. The example implementations include a pattern generator that sends protocol-compliant bit patterns over the communication link despite at least some components of the transmitter otherwise being in a standby mode. As used herein, the term standby mode refers to a lower power mode usable to save power.

In the disclosed examples, the transmitter complies with the Joint Electron Device Engineering Council (JEDEC) Solid State Technology Association's JESD protocols. The JESD protocol is directed to a serial interface between, for example, data converters and logic devices. JESD204B supports data rates up to 12.5 gigabits per second (Gbps), multiple serial lanes, and deterministic latency, among other features. JESD204C supports data rates up to 32 Gbps. Although implementations are described herein for both JESD204B and JESD204C, the disclosed principles are applicable to non-JESD-compliant transmitters as well. The JESD protocols are layered protocols including an application layer, a transport layer, a data stream encoder layer, and a physical layer. The application layer allows for configuration and data generation of the communication link. The transport layer maps data from application layer (e.g., an analog-to-digital converter) to non-scrambled octets. The data stream encoder layer may scramble the data octets and encode the scrambled octets into longer bit sequences. The data stream encoder layer also has an encoding scheme which maintains direct current (DC) balance, provides for Clock Data Recovery (CDR) capability and helps with error detection and/or error correction. The data stream encoder layer is also where control character generation or detection is done for lane alignment monitoring and maintenance. The physical layer is the serializer/deserializer (SERDES) layer responsible for transmitting or receiving the characters at line rate speeds. This layer includes the serializer, drivers, receivers, the clock, and data recovery. The principles described herein are applicable to the data stream encoder layer.

Figure 1:
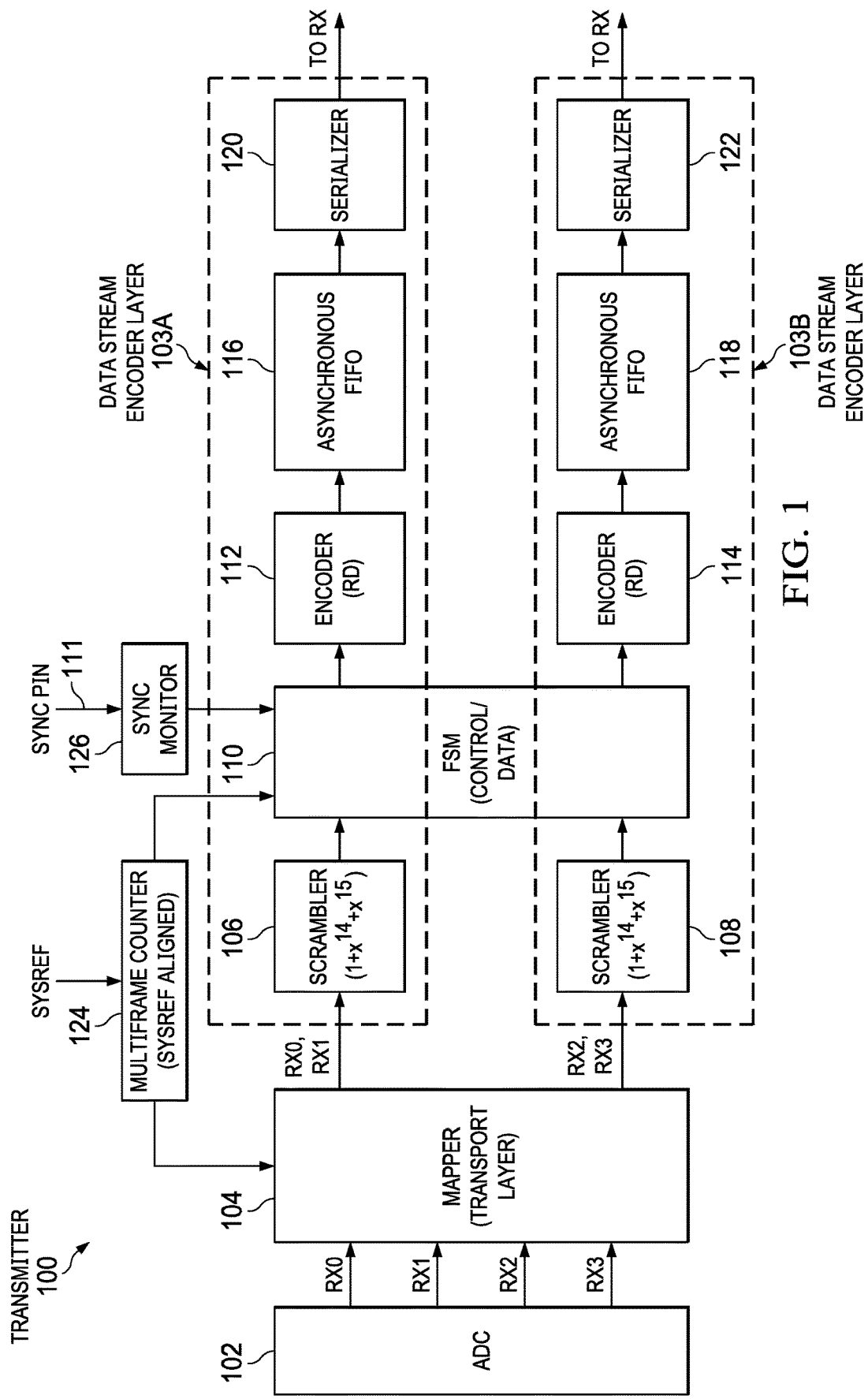
FIG. 1 illustrates a portion of an illustrative transmitter implementing a first protocol (e.g., JESD204B).

FIG. 1 shows an example of a transmitter 100 that complies with JESD204B. In this example, the transmitter includes an analog-to-digital converter (ADC) 102, a mapper 104 and data stream encoder layers 103A and 103B (additional data encoder layers can be included as well). The ADC 102 operates within the application layer. The mapper operates within the transport layer. The ADC 102 produces digital data on one or more ADC channels (RX0-RX3). The digital data from the ADC 102 is provided to the mapper, which maps the ADC channels to the serializers. The example of FIG. 1 illustrates four ADC channels RX0-RX3 that are mapped to two serializers 120, 122. For example, ADC channels RX0 and RX1 may be mapped as shown to serializer 120, and ADC channels RX2 and RX3 may be mapped as shown to serializer 122.

The data stream encoder layer 103A includes scrambler 106, a finite state machine (FSM) 110, encoder 112, an asynchronous first in-first out (FIFO) buffer 116, and a serializer 120. Similarly, data stream encoder layer 103B includes scrambler 108, FSM 110, encoder 114, an asynchronous FIFO buffer 118, and a serializer 122. A multi-frame counter 124 and a synchronization (sync) monitor 126 are also included and coupled to the mapper 104 and FSM 110. Each data stream encoder layer 103A/B implements an individual serial lane. The FSM 110 controls the operation of the serial lanes implemented by the data stream encoder layers—each data stream encoder layer implements a separate serial lane. The sync monitor 126 is coupled to an external sync pin 111. An external device (e.g., the receiver to which the transmitter is coupled) can assert a signal on the sync pin 111 when the external device, for example, requests certain types of data from the transmitter. The sync monitor 126 then can signal the FSM 110 to transmit K28.5 or Initial Lane Alignment (ILA) or transport layer output. The transition of data from K28.5 to ILA to transport layer output should happen at a multiframe boundary which is aligned to external pin SYSREF for ensuring deterministic latency between the transmitter and the receiver. The Multiframe Counter 124 is used to generate and track the multiframe boundary.

Each scrambler 106, 108 scrambles its input octets according to the polynomial $1+x^{14}+x^{15}$ using XOR gates and shift registers to eliminate long strings of consecutive identical transmitted data and reduce spectral lines in the signal spectrum without changing the signaling rates between the transmitter and receiver. Scrambling the data can be advantageous where particular data patterns may otherwise result in the generation of spectra detrimental to the frequencies of operation in a given system. The outputs of the scramblers 106, 108 comprises, in this example, 8-bit scrambled data, which are then provided to the respective encoders 112, 114.

Figures 2, 3:
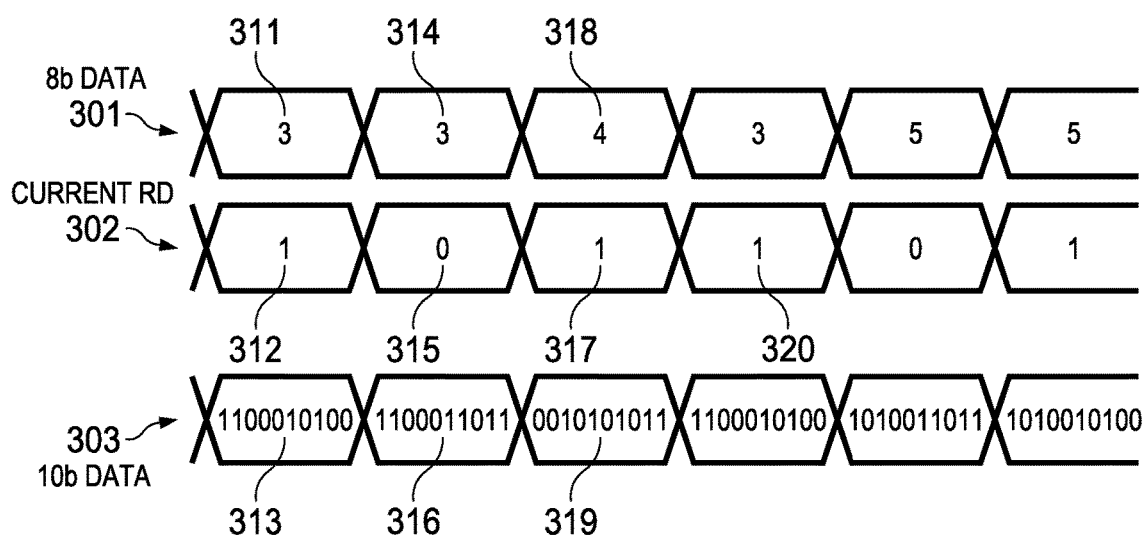
FIGS. 2 and 3 illustrate example data and running disparity states of the transmitter of FIG. 1.

In this example, each encoder 112, 114 converts its 8-bit input data to a 10-bit output bit sequence. The conversion depends on the value of an encoder state. In one example, the encoder state is a running disparity (RD) value which is generated and updated within each encoder. Other types of encoder states are possible as well besides running disparity. The RD value can be one of two states (0 or 1). The 10-bit output bit sequences from the encoders are such that DC balance is maintained thereby permitting AC coupling within the receiver and enabling clock and data recovery (CDR) techniques to be implemented. Examples of the 8-bit to 10-bit conversion are provided in FIG. 2. For any given 8-bit input value, the 10-bit output bit sequence can be one of two values. The example input values in FIG. 2 are shown in decimal form at 201 and in binary form at 206. For example, the first row 230 in FIG. 2 is decimal D0.0 and binary 00000000. The two corresponding 10-bit output values are 100111_0100 (221) and 011000_1011 (223). The particular 10-bit output value that is selected by the encoder depends on the state of RD. If RD currently is 0 (sometimes referred to as minus), then the value at 221 (100111_0100) is selected, but if RD currently is 1 (sometimes referred to as plus), then the value at 223 (011000_1011) is selected.

Column 220 specifies the modification, if any, to RD that the encoder is to make upon selection of the 10-bit output value. "Same" signifies that RD is not be modified, that is, RD remains at the same value. "Flip" signifies that the state of RD is be changed (i.e., a 0 value becomes a 1, and vice versa). If the state of RD is flipped, then the new RD value is used the next time that the encoder converts an input 8-bit value to a 10-bit output bit sequence.

Rows 230-232 and 234 include "same" in column 220. Both 10-bit values in those particular rows have the characteristic of an equal number of 1's and 0's—that is, five 1's and five 0's for each 10-bit value. Having an equal number of 1's and 0's helps to maintain DC balance and thus the RD value need change. Rows 233 and 235 include "flip" in column 220 meaning that the current RD value is flipped upon use of the current RD value to select a corresponding 10-bit output value from that row. Output value 214 in row 233 has six 1's and four 0's, and output value in that same row as four 1's and six 0's. To maintain DC balance, the value of RD is flipped upon selection of an output value from that row. For example, if a sequence of multiple instances of D3.0 (row 233) is to be transmitted by data stream encoder layer 103A/B, then the encoder will switch back-and-forth between value 241 and value 242, thereby on average maintaining DC balance. The same property is true for values 243 and 244. Value 243 has six 1's and four 0's, while value 344 has four 1's and 6's.

The 10-bit output bit sequences from the encoders 112, 114 are provided to their respective asynchronous FIFO buffers 116, 118. Data from the asynchronous FIFO buffer are then serialized by the serializer and transmitted over the serial link to the receiver. The receiver receives the data and can detected various types of errors. For example, the receiver can detect a decoding error if a received 10-bit value does not match a 10-bit value in a look-up table within the receiver. The receiver also can detect a running disparity error when the RD value is not as expected. As illustrated at row 233 of FIG. 2, if value 242 is received, the next 10-bit value received can be 241 and not 242 again as value 242 would violate the RD algorithm described herein. Such a violation is referred to as a Running Disparity Error (RDE).

FIG. 3 provides a sequence of values transmitted by transmitter 100. The 8-bit data to be encoded by encoder 112, 114 is shown at 301. The current value of RD is shown at 302, and the resulting 10-bit output bit sequences from the respective encoder is shown at 303. The first 8-bit value at 311 is decimal 3 (D3.0) and the current RD value as shown at 312 is 1. As can be seen from FIG. 2, value 242 is selected (110001_0100) by the encoder as shown at 313 in FIG. 3. FIG. 2 also shows that that the encoder must flip the state of RD, and thus RD is changed from 1 to 0. The new value of RD (RD=0) is shown at 315 and is used to convert the next 8-bit input value 314. The next 8-bit input value is also decimal 3, but this time RD has changed state so value 241 is selected as the next 10-bit output value at 316. Further, the value of RD is again flipped, with the new state of RD being a 1 as shown at 317. The next 8-bit value (shown at 318) is decimal 4 (D4.0) and with RD being equal to 1, the 10-bit value 250 is selected as indicated at 319. The value of RD is maintained the same as indicated at 320. The process repeats in this manner.

Figure 4:
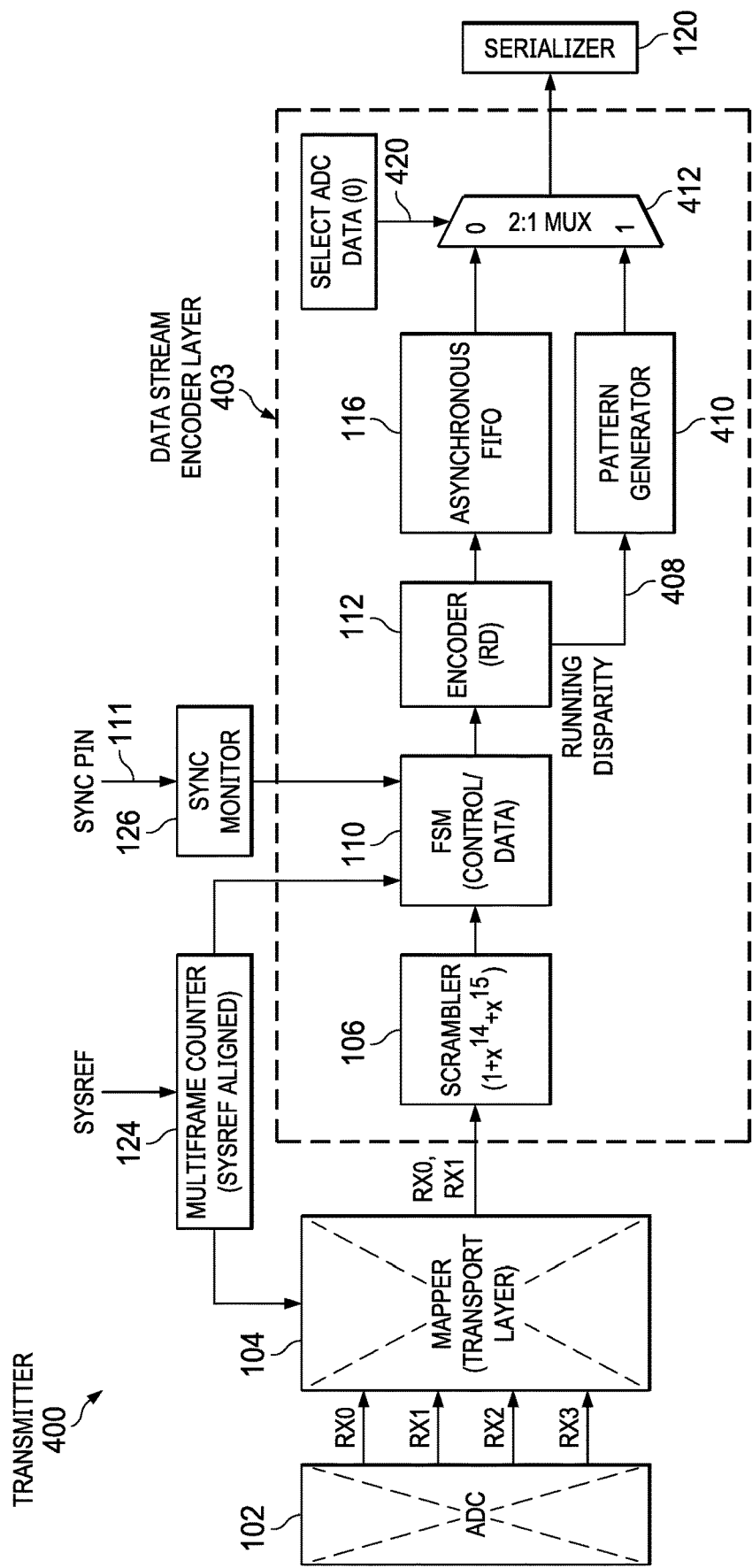
FIG. 4 shows another example of a JESD204B transmitter including a pattern generator.

FIG. 4 shows an example implementation of a transmitter 400, which has some of the same components as shown in FIG. 2. Only a single data stream encoder layer (data stream encoder layer 403) is depicted in FIG. 4 for simplicity, but the description below applies to all data stream encoders. The components in FIG. 4 that are new with respect to FIG. 2 are the pattern generator 410 and multiplexer 412. The transmitter can implement an active mode and a standby mode. While in the active mode, data from the ADC 102 is processed through the data stream encoder layer and transmitted to the receiver. While in the standby mode, at least some components of the data stream encoder layer are powered down to save power. While in the standby mode, the pattern generator 410 is activated. The pattern generator 410 outputs bit patterns that comport with the protocol otherwise implemented by the transmitter (JESD20B in this example). By continuing to provide protocol-compliant data from the transmitter, the communication link between transmitter and receiver remains active and fault-free (e.g., no decoding errors and no running disparity errors).

FIGS. 4-9 provide the same block diagram as in FIG. 1 while illustrating a time sequence of state changes for transmitter 400 as the transmitter and its data stream encoder layer transition from the active mode to the standby mode and then from the standby mode back to the active mode. Each dashed X across a component indicates that that component is powered down. During the active mode, the control signal 420 to multiplexer 412 is set to select the 0-input (the output of asynchronous FIFO buffer 116). The control signal 420 may be controlled by FSM 110. In FIG. 4, the transmitter begins to enter the standby mode, and the ADC 102 and mapper 104 are powered down. Upon beginning to transition to the standby mode, the current RD value is provided (408) from the encoder 112 to the pattern generator 410. The current RD value is a control parameter provided to the pattern generator.

Figure 5:
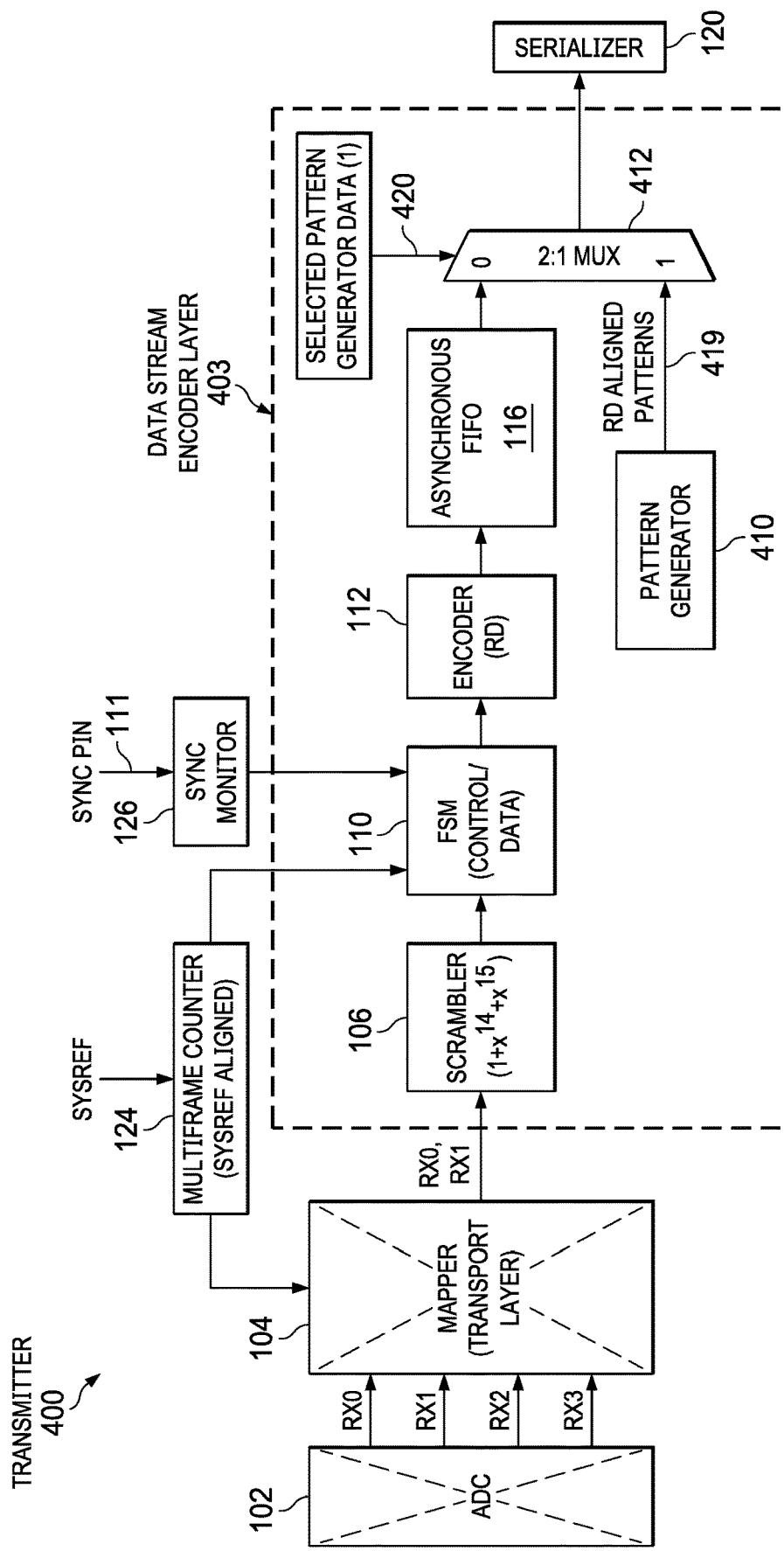
FIGS. 5-9 illustrate a time sequence of states of the transmitter of FIG. 4 as the transmitter transitions from the active mode to the standby mode and back to the active mode.
Figure 11:
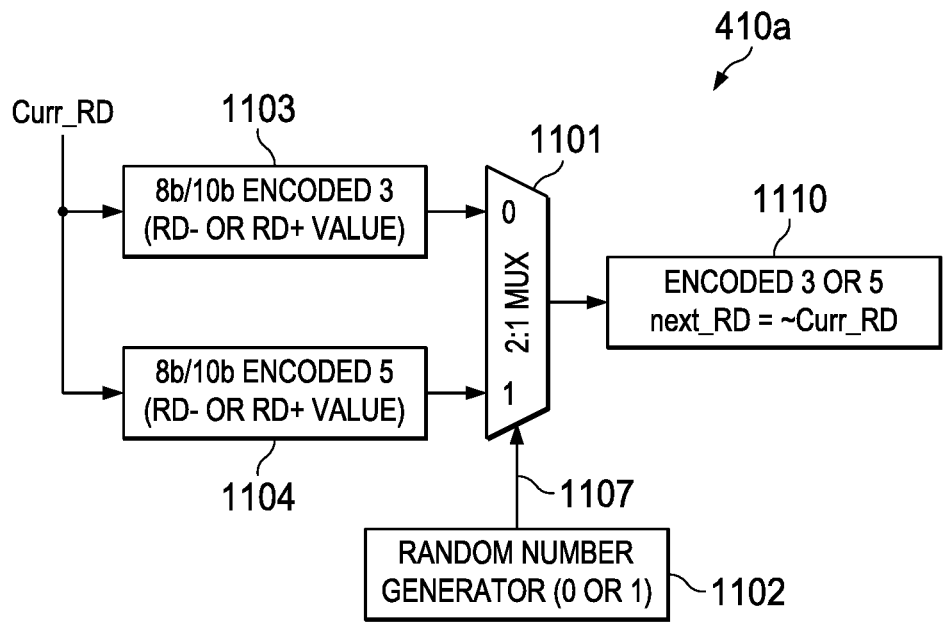
FIGS. 11 and 12 show example implementations of the pattern generator of FIG. 4.
Figure 12:
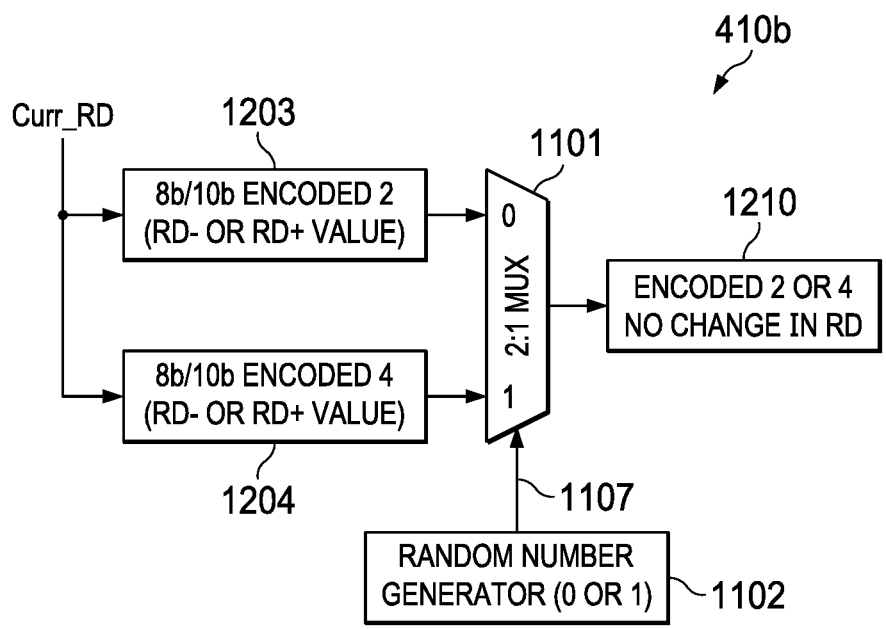

In FIG. 5, the control signal 420 has changed so as to cause multiplexer 412 to select its 1-input, and thus the output from the pattern generator 410. The pattern generator 410 uses the RD value from the encoder 112 to determine an appropriate bit pattern 419 to provide through multiplexer 412 to serializer 120. Example implementations of pattern generator 410 are shown in FIGS. 11 and 12 and are discussed below. The pattern generator 410 has multiple valid 10-bit bit patterns that it can output at 419 and updates the RD value with each successive value provided to the 1-input of multiplexer 412 as described above.

Figure 6:
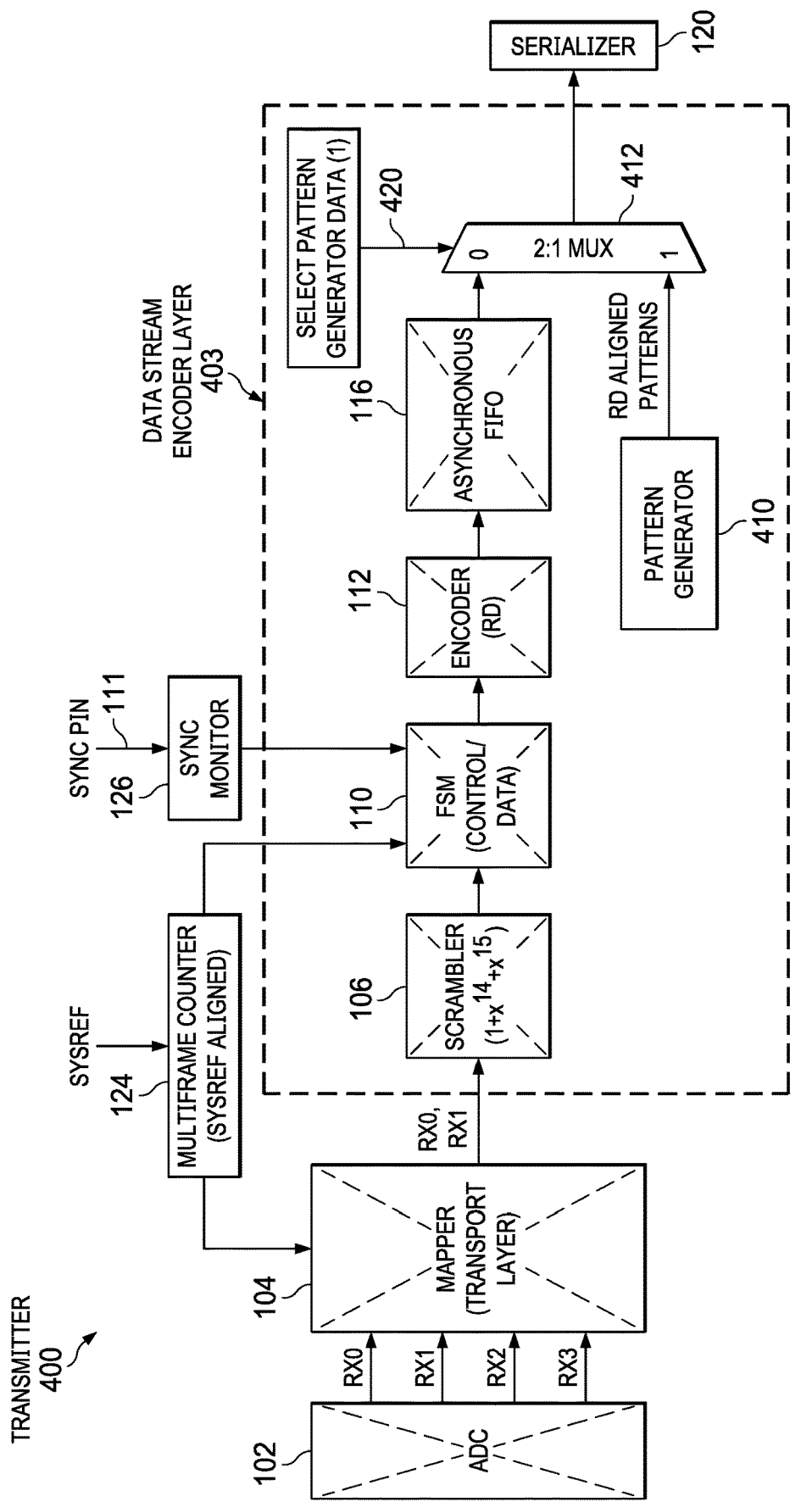

FIG. 6 illustrates that, in addition to the ADC 102 and mapper 104, scrambler 106, FSM 110, encoder 112, and asynchronous FIFO buffer 116 are also powered down. Multiframe counter 124 and synch monitor 126 remain powered on in this example. Despite a majority of the components of the data I stream encoder ink layer 403 being powered down in the standby mode, serial data continues to be transmitted through the serializer 120 through use of the pattern generator 410.

Figure 7:
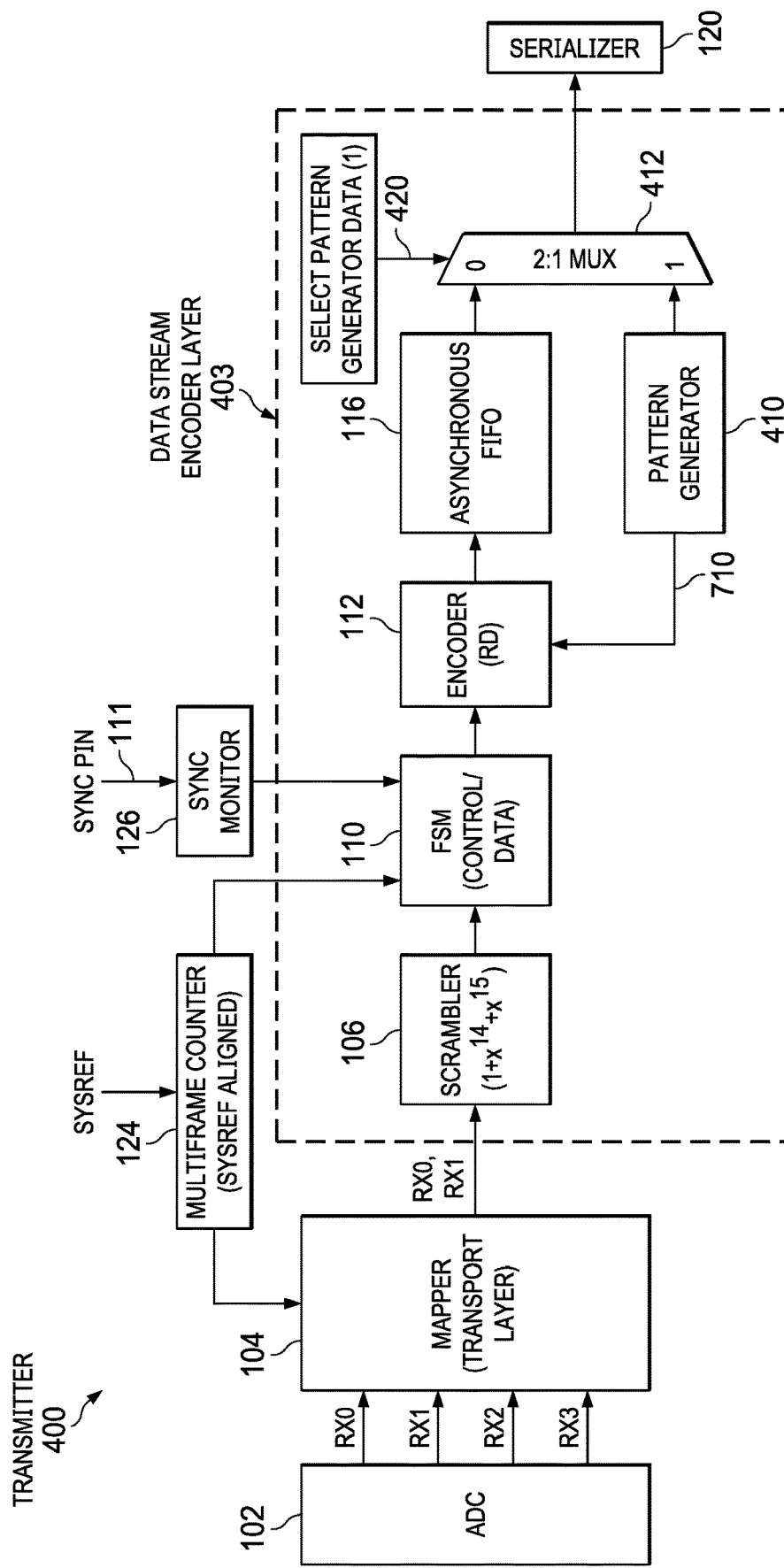

FIG. 7 illustrates the transition from the standby mode to the active mode. The previously powered down components are now powered on—ADC 102, mapper 104, scrambler 106, FSM 110, encoder 112, and asynchronous FIFO buffer 116. The RD value currently used by the pattern generator 410 is provided (710) to the encoder 112 so that the encoder 112 can use that RD value to generate its next 10-bit output value. By the encoder 112 and pattern generator 410 providing their current RD value to the other component at each active-standby mode transition, consistent and error-free use of running disparity is achieved. FIG. 7 also shows that control signal 420 multiplexer 412 is still set to the 1-input of the multiplexer.

Figure 8:
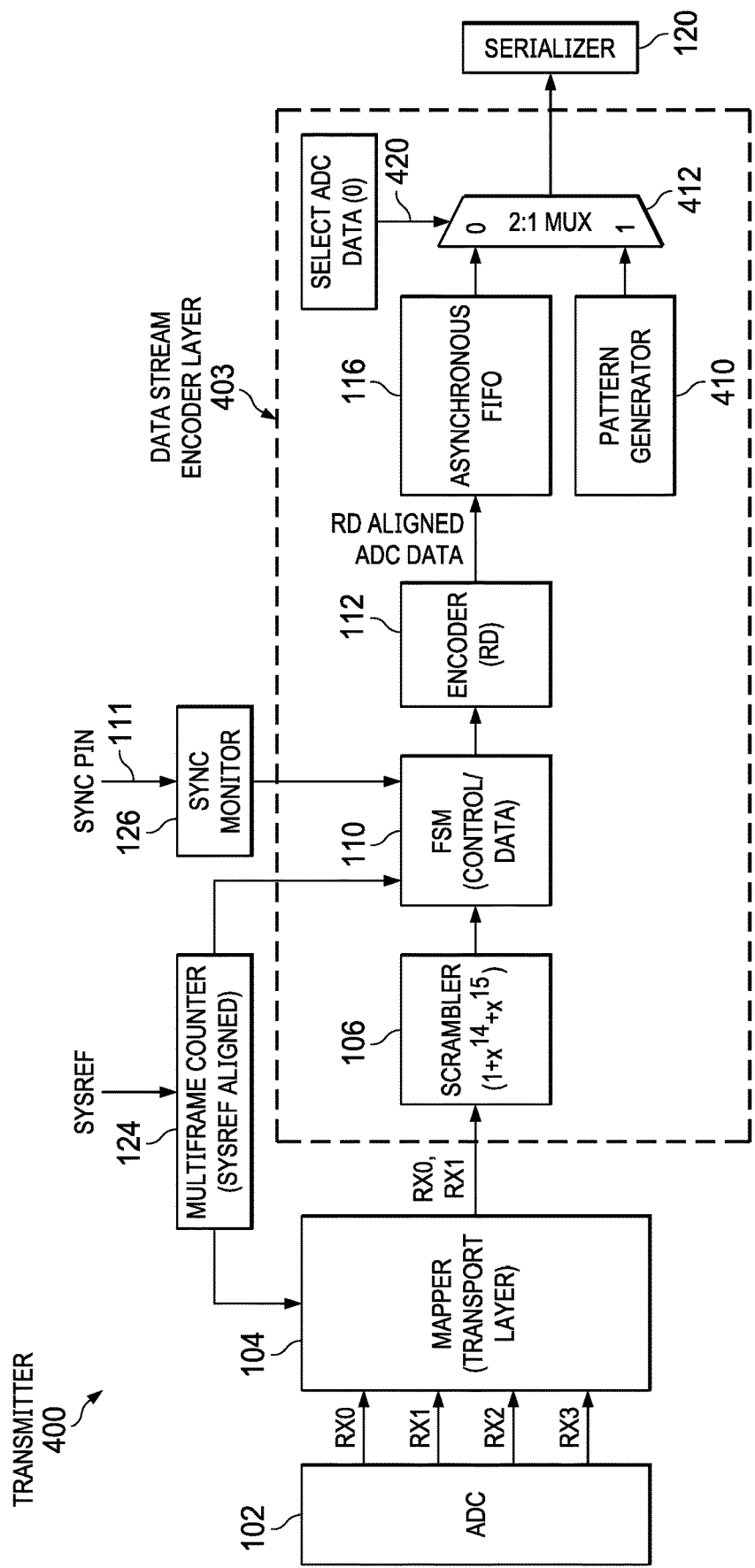
Figure 9:
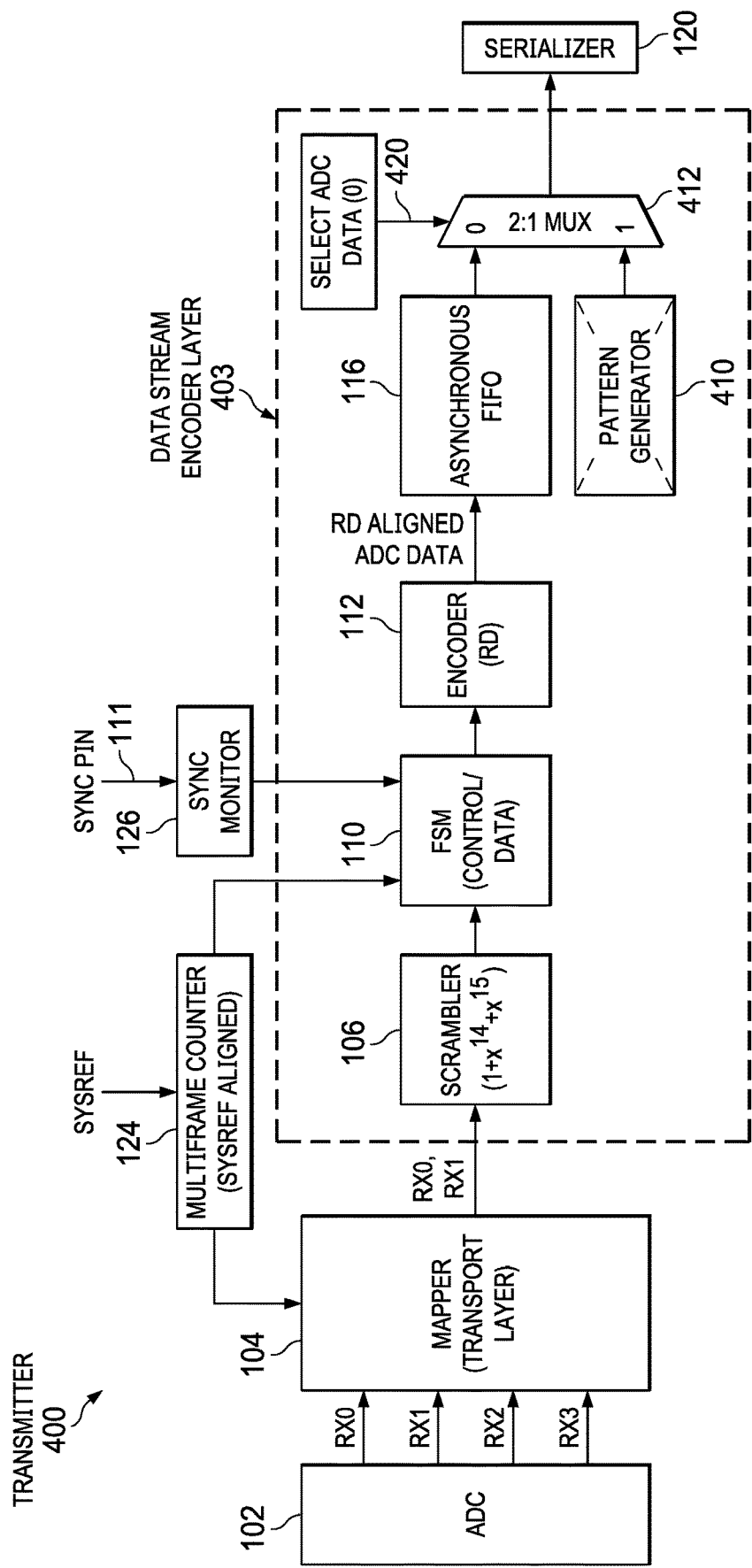

FIG. 8 illustrates that the control signal 420 has been changed to cause the multiplexer 412 to select the 0-input. At this point, the transmitter 400 is in the active mode and ADC data that has been scrambled and encoded by encoder 112 is provided through multiplexer 412 to the serializer 120. FIG. 9 illustrates that the pattern generator 410 can be powered down because the transmitter is in the active mode.

Figure 10:
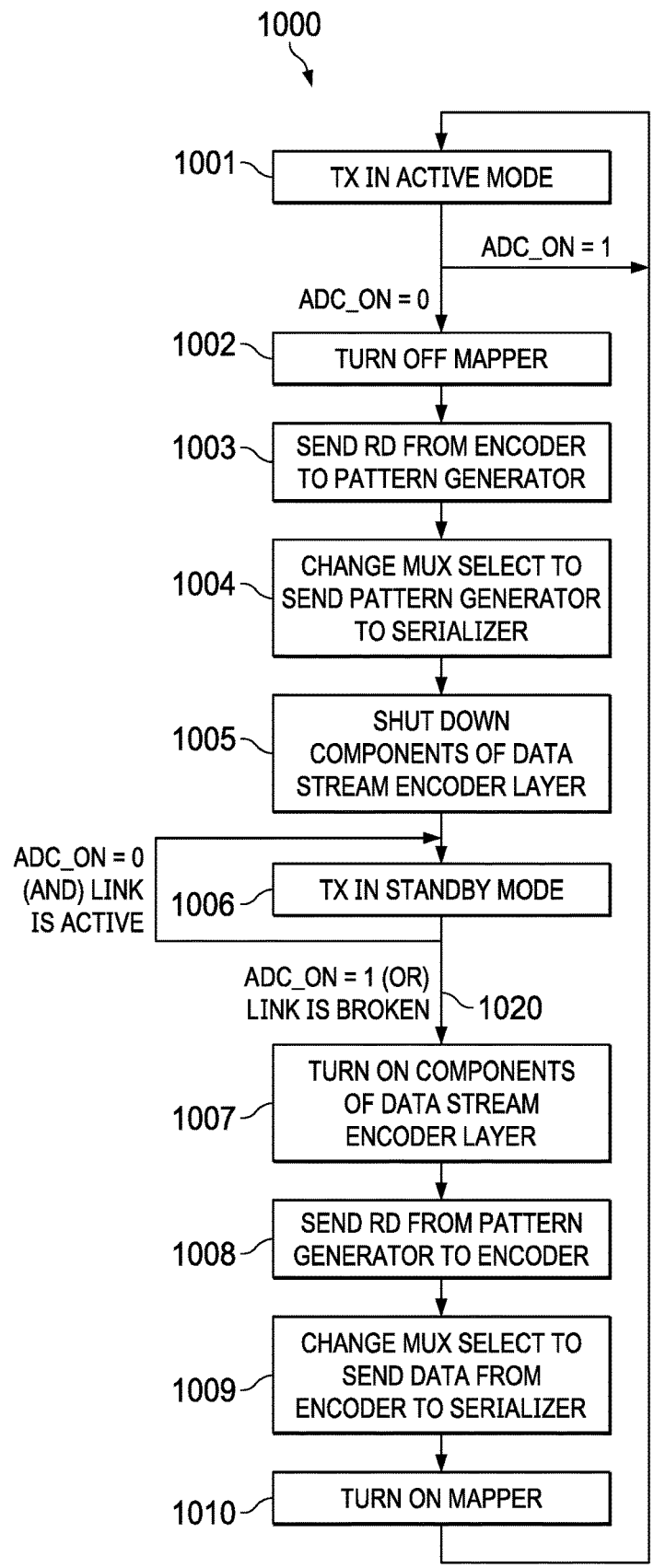
FIG. 10 shows a flow chart for the transmitter of FIG. 4.

FIG. 10 illustrates a flowchart 1000 of the sequence of steps in transitioning transmitter 400 from the active mode to the standby mode and back to the active mode. Starting at 1001, the transmitter 400 is in the active mode. The flag ADC_ON indicates whether the transmitter 400 is to be in the active mode (ADC_ON=1) or in the standby mode (ADC_ON=0). When ADC_ON is set to 0, the mapper 104 is turned off at 1002. The ADC 102 also is turned off. Then, at 1003, the RD value is sent from the encoder 112 to the pattern generator 410. At 1004, the state of multiplexer 412 is changed so as to provide the bit sequences from the pattern generator 410 to the serializer 120. At 1005, additional components within the data stream encoder layer are powered down (e.g., any or all of scrambler 106, FSM 110, encoder 112, and asynchronous FIFO buffer 116). At 1006, the data stream encoder layer 403 is in the standby mode with valid bit patterns transmitted from the pattern generator 410 across the link to the receiver to maintain the link active.

At 1020, if either the ADC_ON flag is set to 1 or if the receiver requests special data characters from transmitter via the sync pin 111, the transmitter should transition from the standby mode back to the active mode. At 1007, the previously powered down components of the data stream encoder layer 403 are powered on (scrambler 106, FSM 110, encoder 112, and asynchronous FIFO buffer 116). At 1008, the current RD value from the pattern generator 410 is provided to the encoder 112. At 1009, the state of multiplexer 412 is changed so as to provide the bit sequences from the asynchronous FIFO buffer 116 (and thus from ADC 102 after the mapper 104 is turned on) to the serializer 120. The mapper 104 (and ADC 102) is powered on at 1010 and the transmitter 403 is fully back in the active mode at 1001.

FIG. 11 shows an example pattern generator 410a usable to implement the pattern generator 410. The pattern generator 410a includes a multiplexer 1101 and a random number generator 1102. The random number generator 1102 generates a random or pseudo-random sequence of 0's and 1's as the control signal 1107 to multiplexer 1101. In one example, the random number generator 1102 is implemented as a linear feedback shift register. While the random number generator 1102 is referred to as being a "random number" generator, in general it is a random or pseudo-random number generator. Multiplexer 1101 has a 0-input and a 1-input. The 0-input is coupled to a storage element 1103, and the 1-input is coupled to storage element 1104. Each storage element provides two or more 10-bit values that comply with JESD204B. Each storage element may comprise memory, a register, or other circuit for providing pre-determined bit patterns to the multiplexer 1101. In this example, storage element 1103 provides the two, 10-bit values corresponding to decimal 3 (D3.0) shown in FIG. 2, that is, 110001_1011 and 110001_0100. Storage element 1104 provides the two, 10-bit values corresponding to decimal 5 (D5.0) which are 101001_1011 and 101001_0100. These particular 10-bit values require the RD value to be flipped as explained previously. Randomization eliminates long strings of consecutive identical transmitted data transmitted during the standby mode and reduces spectral lines in the signal spectrum Depending on the state of the random number (0 or 1) from the random number generator 1102, the multiplexer 1101 outputs either the 10-bit value from storage element 1103 or the 10-bit value from storage element 1104. The particular 10-bit value provided from the respective storage element 1103, 1104 depends on the state of RD. Upon initial transition into the standby mode, RD is provided by the encoder. With each successive selection of a 10-bit value from the storage elements through the multiplexer 1101, logic block 1110 flips the state of RD, and the new RD value is used to cause the storage elements 1103, 1104 to output the corresponding value to the multiplexer inputs.

FIG. 12 provides another example implementation of a pattern generator 410b that is similar to pattern generator 410a of FIG. 11. In FIG. 12, storage element 1203 provides the two, 10-bit values corresponding to decimal 2 (D2.0), that is, 101101_0100 and 010010_1011. Storage element 1204 provides the two, 10-bit values corresponding to decimal 4 (D4.0) which are 110101_0100 and 001010_1011. These particular 10-bit values require the RD value to remain unchanged as explained previously, as indicated within logic block 1210.

Figure 13:
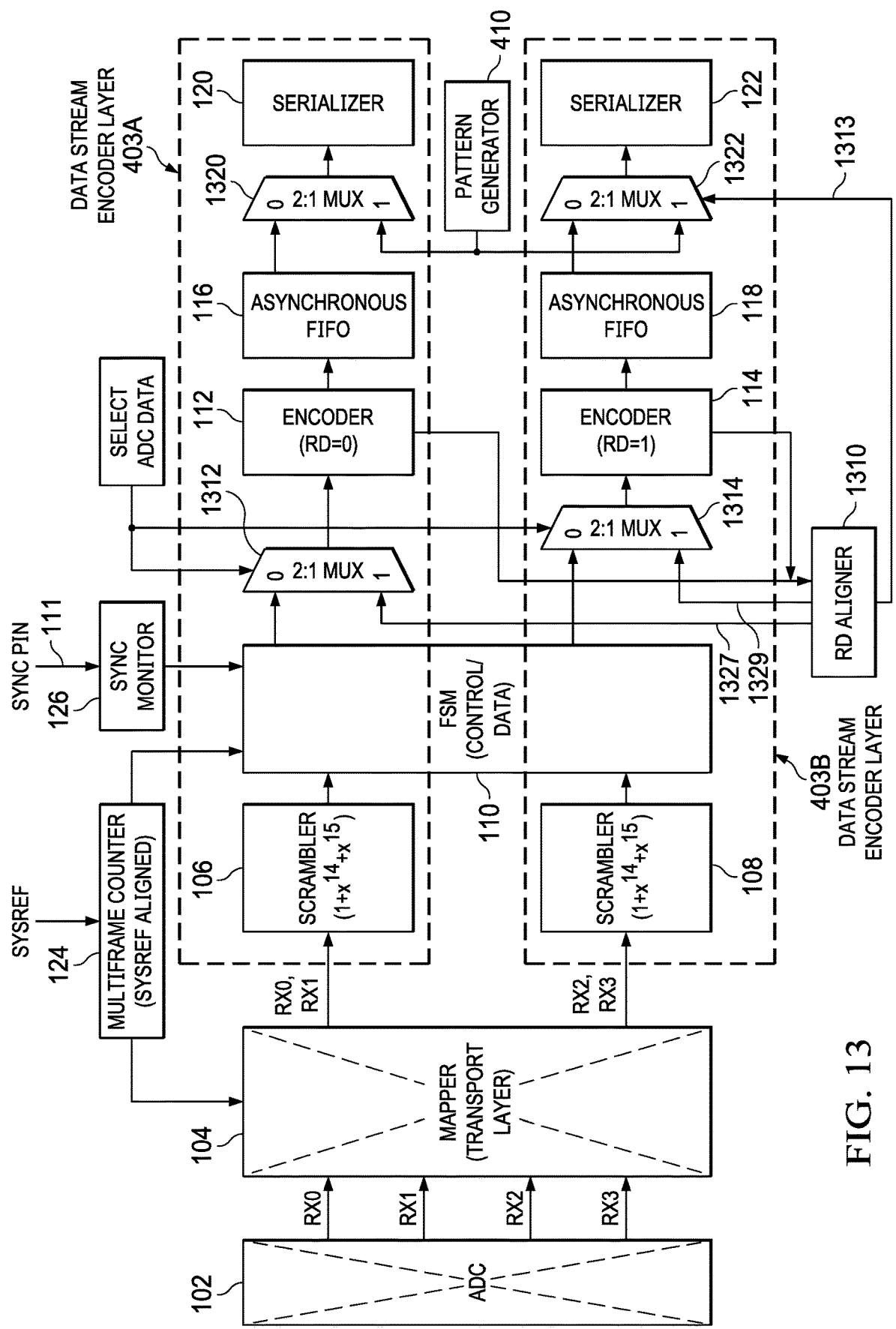
FIG. 13 illustrates the use of a running disparity aligner for permit multiple serial lanes to use one pattern generator.

FIG. 13 illustrates an example of two data stream encoder layers 403A and 403B and a common sync pin (although separate sync pins can be provided—one for each data stream encoder layer. One data stream encoder layer 403A includes scrambler 106, encoder 112, asynchronous FIFO buffer 116, and serializer 120. Data stream encoder layer 403B includes scrambler 108, encoder 114, asynchronous FIFO buffer 118, and serializer 122. More than two data stream encoder layers can be implemented in other embodiments. In this example, pattern generator 410 is shared by both data stream encoder layers. Multiplexers 1312, 1314, 1320, and 1322 and an RD aligner 1310 are also included. Multiplexer 1312 has one input that receives the output of one of the scramblers (e.g., scrambler 106) and another input coupled to the RD aligner. Similarly, multiplexer 1314 has one input that receives the output of one of the scramblers (e.g., scrambler 106) and another input coupled to the RD aligner. The output of multiplexer 1312 is coupled to the input of encoder 112, and the output of multiplexer 1314 is coupled to the input of encoder 114. Multiplexer 1320 has one input that receives the output of asynchronous FIFO buffer 116 and another input coupled to the output of the pattern generator 410. Similarly, multiplexer 1322 has one input that receives the output of asynchronous FIFO buffer 118 and another input coupled to the output of the pattern generator 410.

To be able to share pattern generator 410 between multiple serial lanes of separate data stream encoder layers, the serial lanes should operate in the same RD state. The example of FIG. 13 shows that currently, encoder has its RD at 0 and encoder 114 has its RD at 1, that is, two different RD states. The control inputs of multiplexers 1312 and 1314 is current set to the 0-input (by, for example, FSM 110), that is, to cause data from the ADC 102 to be provided to the respective encoders 112, 114.

Figure 14:
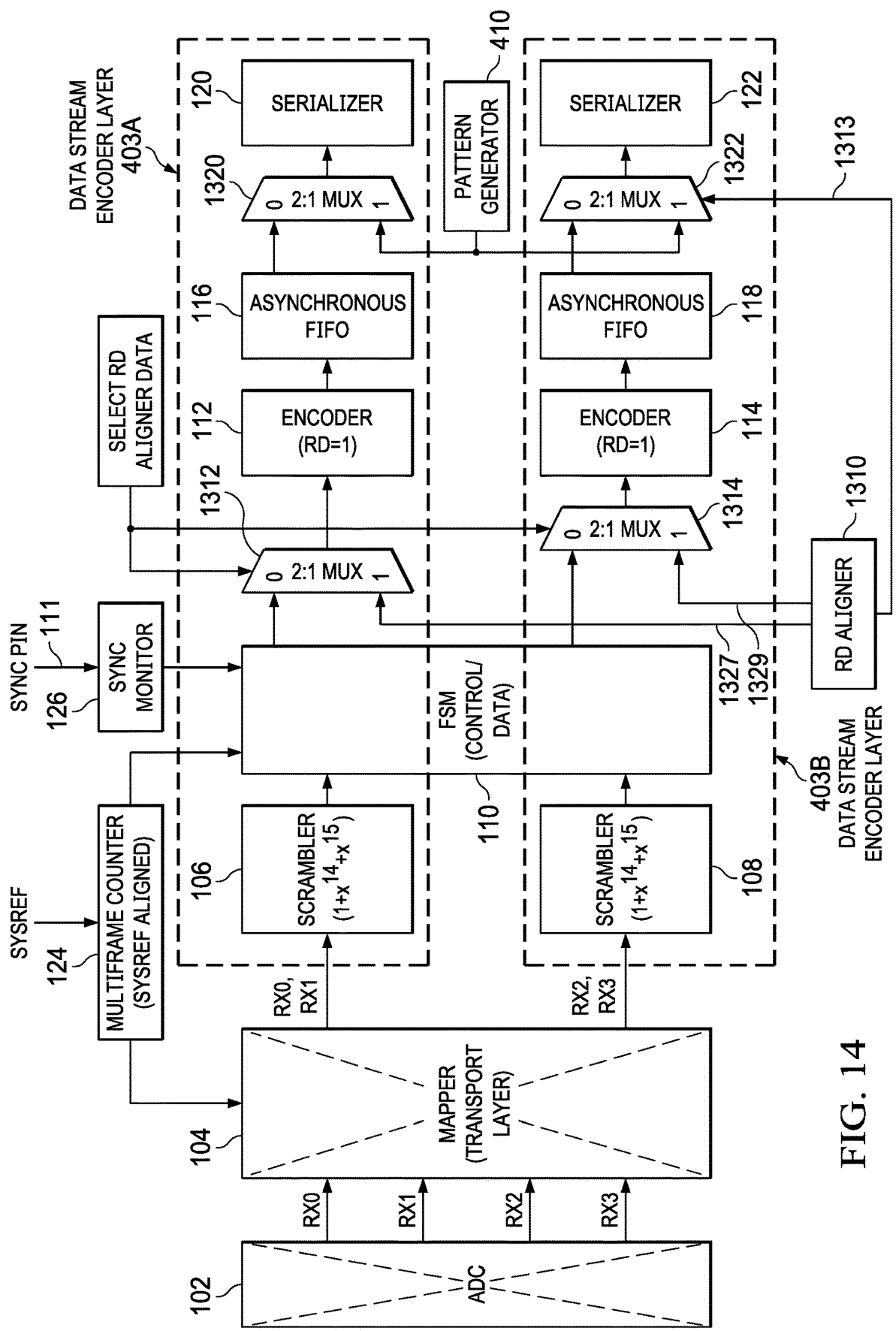
FIGS. 14 and 15 illustrate a time sequence of states of the transmitter of FIG. 13 as the transmitter transitions from the active mode to the standby mode and back to the active mode.

When the ADC 102 enters the standby mode, the ADC 102 and mapper 104 are powered down (as shown in FIG. 13), and the RD states of encoders 112 and 114 are read by the RD aligner 1310. If an encoder's RD state is 0, the RD aligner 1310 sends a bit pattern through that encoder's input multiplexer to cause the RD state of the encoder to change state. If an encoder's RD state is 1, the RD aligner 1310 sends a bit pattern through that encoder's input multiplexer to retain the RD state of the encoder. FIG. 2 shows examples of bit patterns which cause the RD state to flip. In the example of FIG. 13, the RD aligner 1310 sends a bit pattern across signal line 1327 through multiplexer 1312 to encoder 112 to cause the RD state of encoder 112 to change from 0 to 1. The bit pattern sent by RD aligner 1310 over signal line 1329 through multiplexer 1314 to encoder 114 causes the RD state of encoder to remain a 1. The FSM 110 changes the control signal for multiplexers 1312 and 1314 to select the 1-input so that bit patterns from the RD aligner can be pass through the multiplexers to the respective encoders. FIG. 14 illustrates the subsequent state of the transmitter with the RD states of both encoders 112, 114 at 1.

As explained above, the RD aligner 1310 ensures that the RD states of all serial lanes are initialized to 1. Alternatively, the RD aligner can ensure that the RD states of all serial lanes are initialized to 0. This initialized RD state value can be predetermined and eliminates the communication of RD state between encoder layer and pattern generator. Further, pattern generator 410b can store only one RD type pattern i.e. either RD state of 0 (RD−) or 1 (RD+) in each of the storage elements 1203 and 1204.

Figure 15:
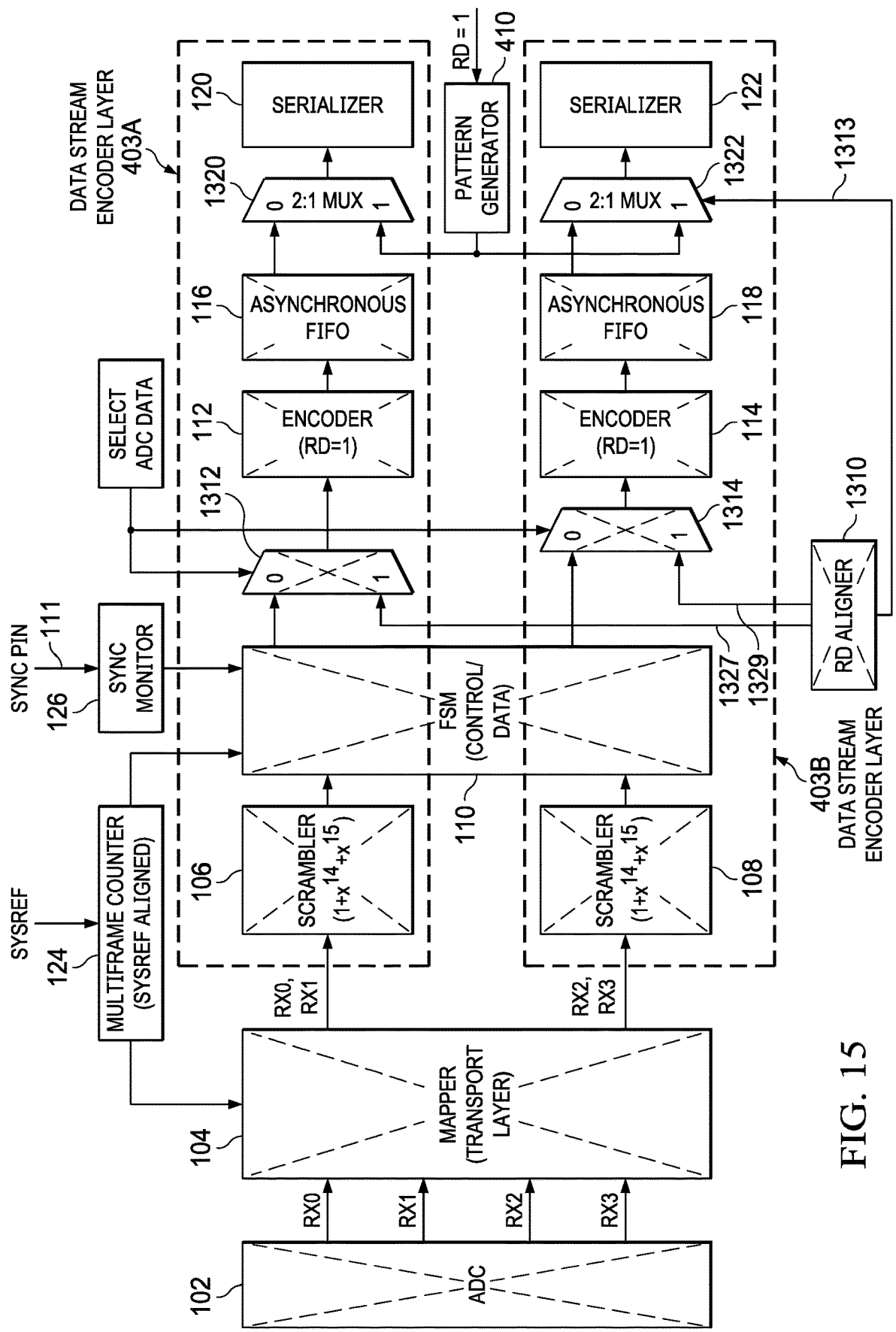

With all serial lanes shared by the pattern generator 410 in the same RD state, the RD aligner can assert a control signal 1313 to multiplexers 1320 and 1322 to cause those multiplexers to select their 1-inputs. Pattern generator 410 then can transmit its bit patterns as described above through multiplexers 1320 and 1322. Further, at least some components of the data stream encoder layer 1303 are powered down. FIG. 15 illustrates that scramblers 106 and 108, FSM 110, encoders 112 and 114, asynchronous FIFO buffers 116 and 118 are powered off, as well as multiplexers 1312 and 1314 and RD aligner 1310.

Figure 16:
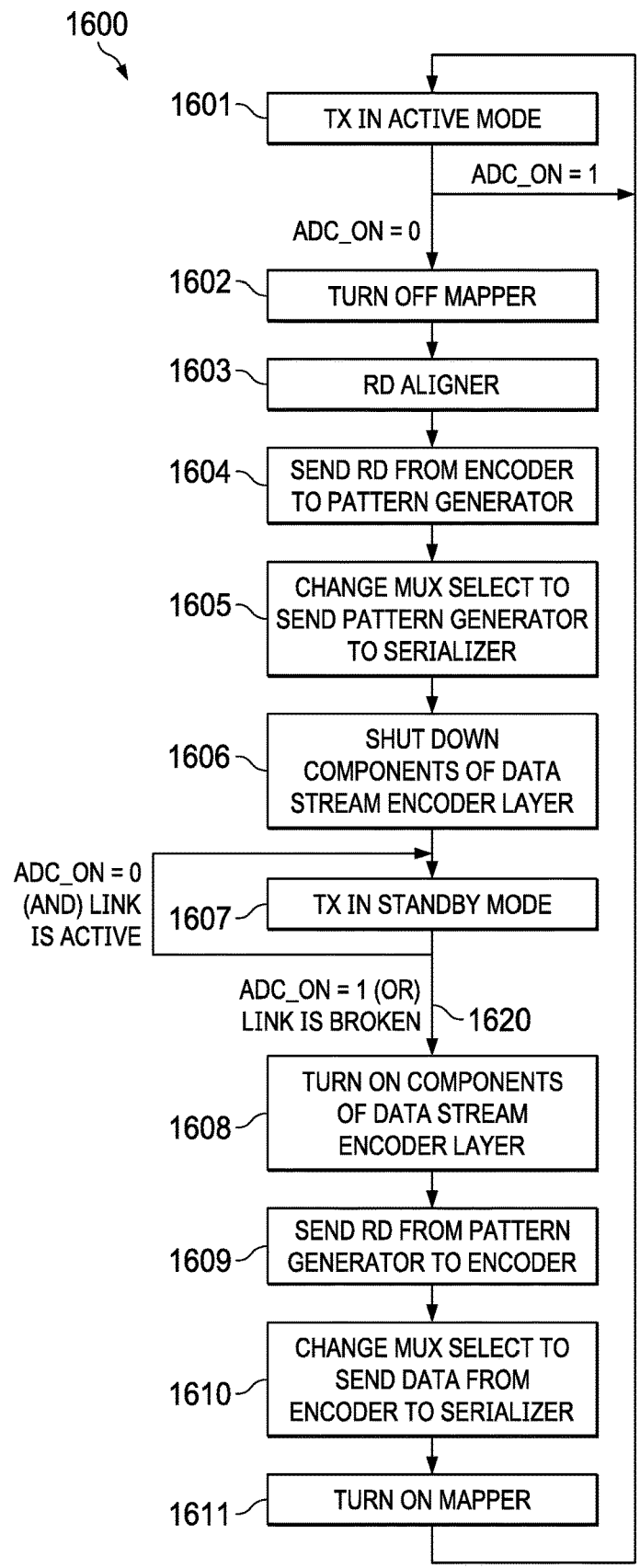
FIG. 16 shows a flow chart for the transmitter of FIG. 13.

FIG. 16 illustrates a flowchart 1600 of the sequence of steps in transitioning the transmitter with multiple data stream encoder layer sharing a common pattern generator (e.g., the example of FIGS. 13-15) from the active mode to the standby mode and back to the active mode. Starting at 1601, the transmitter is in the active mode. As explained above, the flag ADC_ON indicates whether all of the transmitters are to be in the active mode (ADC_ON=1) or in the standby mode (ADC_ON=0). When ADC_ON is set to 0, the mapper 104 is turned off at 1602. The ADC 102 also is turned off. At 1603, the RD aligner 1310 aligns the data stream encoder layers as described above.

At 1604, the initial RD value (e.g., RD=1) is initialized at the pattern generator 410. At 1605, the state of multiplexers 1320 and 1322 are changed so as to provide the bit sequences from the pattern generator 410 to the respective serializers 120 and 122. At 1606, additional components within the data stream encoder layer 1303 are powered down (e.g., any or all of scramblers 106 and 108, FSM 110, encoders 112 and 114, and asynchronous FIFO buffers 116 and 118). At 1607, the data stream encoder layer 1303 is in the standby mode with valid bit patterns transmitted from the pattern generator 410 across the link to the receiver to maintain the link active.

At 1620, if either the ADC_ON flag is set to 1 or the receiver requests special data characters from a transmitter via the sync pin 111, the transmitters should transition from the standby mode back to the active mode. At 1608, the previously powered down components of the data stream encoder layer 1303 are powered on (scramblers 106 and 108, FSM 110, encoders 112 and 114, and asynchronous FIFO buffers 116 and 118). At 1609, the current RD value from the pattern generator 410 is provided to the encoders 112 and 114. At 1610, the states of multiplexers 1320 and 1322 are changed so as to provide the bit sequences from the respective asynchronous FIFO buffers 116 and 118 (and thus from ADC 102 after the mapper 104 is turned on) to the serializer 120. The mapper 104 (and ADC 102) is powered on at 1611 and the transmitter is fully back in the active mode at 1601. The example of flowchart of FIG. 16 illustrates the communication of the RD value between the encoder and the pattern generator, but other examples eliminate the communication of the RD values.

Figure 17:
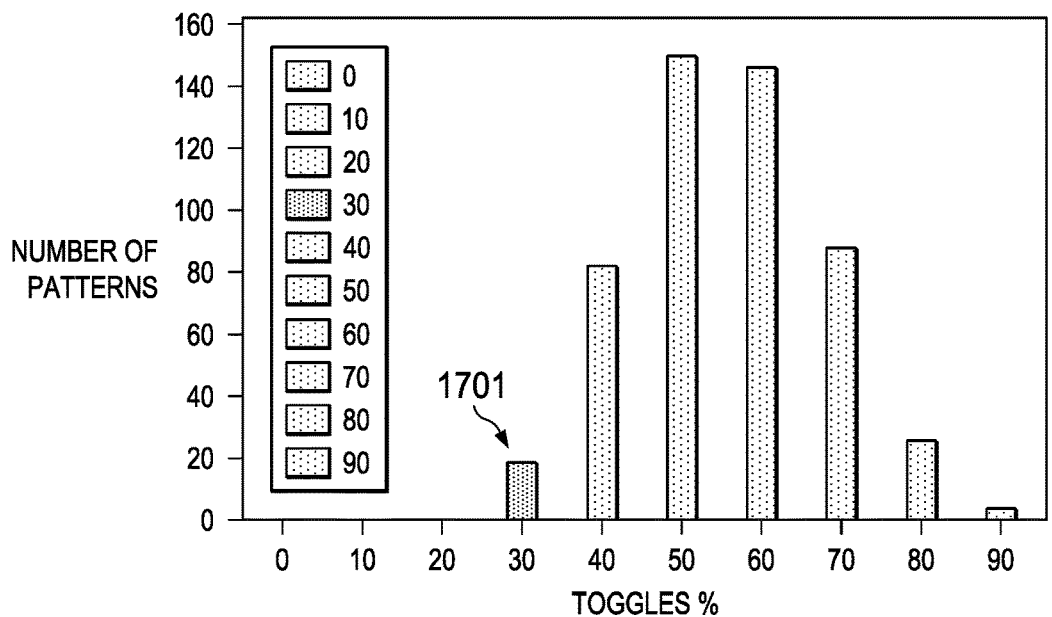
FIG. 17 is a histogram of the bit toggle percentages for valid bit patterns implementing the JESD204B protocol.
Figure 18:
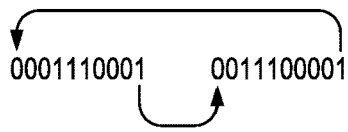
FIGS. 18 and 19 illustrate that some bit sequences result in fewer toggles than other bit sequences and thus result in less power consumed by the transmitter's serializer.
Figure 19:
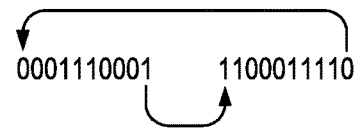

As serial bits are output by the serializers, the serializer consumes power for each bit toggle (i.e., a 0 followed by a 1, or a 1 followed by a 0). The fewer bit toggles a bit pattern has results in the serializer consuming less power. FIG. 17 illustrates an example histogram of the percentage of bit toggles for various bit patterns. As shown at 1701, some 10-bit bit patterns only have bit toggles across 30% of the patterns' bits, while other bit patterns have a higher percentage of bit toggles (40%, 50%, etc.). In accordance with an example, the pattern generator 410 is configured to only implement those bit patterns that result in fewer bit toggles, thereby resulting in the serializers to consume less power. The bit patterns implemented by the pattern generator also take into account bit toggles at the end of one bit sequence and the beginning of the next bit sequence. FIG. 18 illustrates two back-to-back 10-bit bit sequences which include bit toggles from one to the next. FIG. 19 illustrates two back-to-back, 10-bit bit sequences for which the bits do not change state from the end of one sequence to the beginning of the other. That is, the first bit of the first 10-bit bit pattern matches the last bit of the second 10-bit bit pattern, and vice versa. Thus, all else begin equal, the bit patterns of FIG. 19 will result in less power being consumed by the serializers compared to the bit patterns of FIG. 18.

However, each of the two 10-bit bit sequences shown in FIG. 19 begin and end with different bit values. Thus, if the same 10-bit sequence was randomly selected in back-to-back patterns, then there would be a logic state transition from instance of the same bit pattern to then next instance of the same bit pattern. The 8b10b bit patterns defined by the JESD204B protocol all have different values for their beginning and ending bits. However, by extending the size of the bit patterns from 10-bits to 20-bits, then 20-bit bit patterns can be used that have the same starting and ending bits and thus have bit state transitions between successive bit patterns, regardless of whether the successive bit patterns are the same or different patterns. For example, both 10-bit bit sequences in FIG. 19 can be considered to be one, 20-bit pattern. As shown, the beginning and ending bits are 0 and thus there would be no change of bit state if the same 20-bit bit pattern was selected twice in succession. Other combinations of JESD204B-compliant 10-bit bit patterns can also be concatenated to form a 20-bit bit pattern also having a "0" as the starting and ending values. Combinations of JESD204B-compliant 10-bit bit patterns can also be concatenated to form a 30-bit bit patterns, 40-bit bit patterns, and so on. The concatenated patterns should use 10-bit patterns of appropriate RD values to be compliant with 8b/10b encoding scheme which will not result in RD errors at the receiver.

Figure 20:
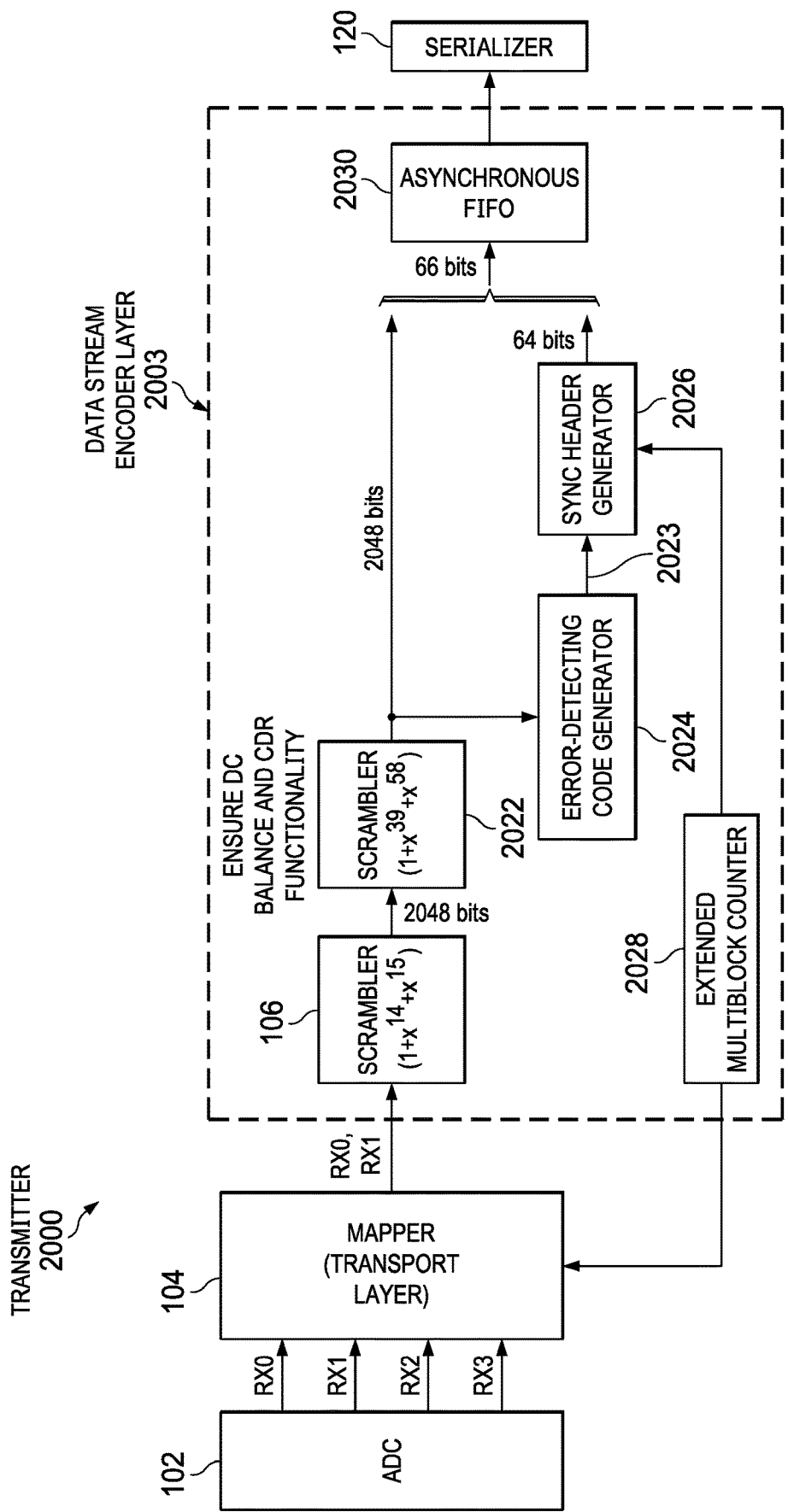
FIG. 20 illustrates a portion of an illustrative transmitter implementing a second protocol (e.g., JESD204C).

FIG. 20 illustrates a portion of a transmitter 2000 that implements the JESD204C protocol. The transmitter 2000 includes the data generation logic including ADC 102, mapper 104, and scrambler 106, as were described above. A data stream encoder layer 2003 is also identified. The transmitter 2000 also include a second scrambler 2022, an error-detecting code generator 2024, a sync header generator 2026, an extended multiblock counter 2028, and asynchronous FIFO buffer 2030, and a serializer 120. The data stream encoder layer 2003 includes the scramblers 106 and 2022, the error-detecting code generator 2024, the sync header generator 2026, the extended multiblock counter 2028, and the asynchronous FIFO buffer 2030. A single lane is illustrated in FIG. 20, but multiple lanes can be implemented in other examples. The mapper 104 maps one or more of the ADC output channels onto the serial lane through the data stream encoder layer 2003.

The scrambler 2022 ensures DC balance (equal number of 1's and 0's over a large bit sequence) and also facilitates CDR functionality. In the example of FIG. 20, the output of scrambler 2022 is a series of 2048 bit sequences. The output bit sequence from scrambler 2022 is provided to the error-detecting code generator 2024. The error-detecting code generator 2024 computes an error code 2023 based on the output bit sequence from scrambler 2022. The error code 2023 may comprise a cyclic redundancy check (CRC) code, a forward error correction (FEC) code, or other suitable type of error code that permits a receiver to determine whether the data it has received and decoded is valid.

The 2048 bits from scrambler 2022 comprises 32×64b bit sequences, that is, 32 sequences with each sequence comprising 64b. The error detecting code generator 2024 computes an error detecting code comprising 64 bits for each sequence of 2048 bits. Sixty-four bits of the scrambled data and two bits of the 64-bit error detecting code (2 bits are also a sync header) are transmitted as 66-bit words as a "block." For 32×64 bits of scrambled data, the final output is 32×66 bits or 32 blocks which is called a multiblock. The 66-bit wide bocks are stored in asynchronous FIFO buffer 2030. The two-bit sync header can be either "01" or "10". By ensuring that, after every 64 bits of scrambled data, a "01" or "10" is transmitted, the receiver can align to the 66 bit boundary (comma alignment). The serializer 120 then transmits in serial fashion each set of 66 bits.

Figure 21:
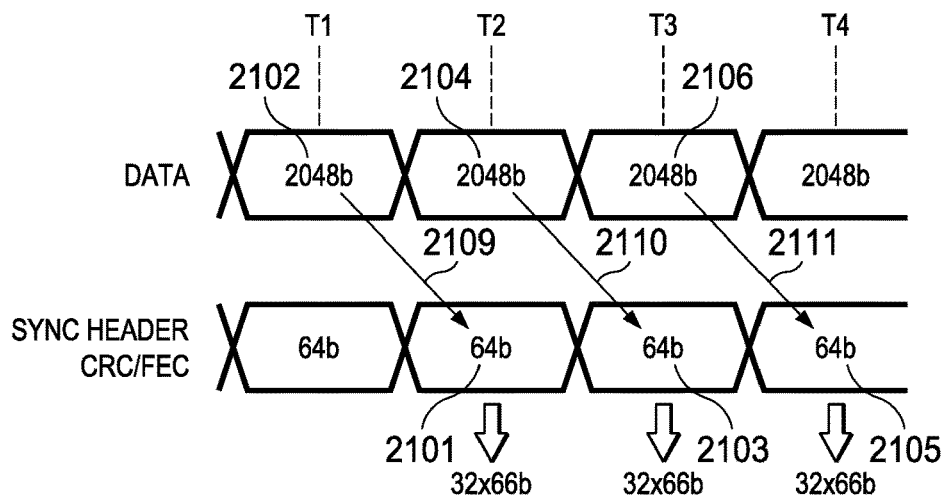
FIG. 21 illustrates the formation of bit sequences using error codes and data values.

The computation of the error code 2023 by the error-detecting code generator 2024 takes a finite amount of time. Per the JESD204C protocol, the error code 2023 output by the error-detecting code generator 2024 is output along with the subsequent 2048 bits of data. This process is illustrated in FIG. 21. FIG. 21 illustrates three 2048b data values 2102, 2104, and 2106 and three 64b error codes 2101, 2103, and 2105 provided to the asynchronous FIFO buffer 2030 in subsequent time periods T1, T2, T3, and T4. Arrows 2109-2111 indicate the correspondence between error codes and data values. Arrow 2109 indicates that error code 2101 was computed for data value 2102. Arrow 2110 indicates that error code 2103 was computed for data value 2104. Arrow 2111 indicates that error code 2105 was computed for data value 2106. Time period T2 includes data value 2104 but error code 2101 computed for data value 2102, which itself was output in time period T1. The error code 2103 computed for data value 2104 is output in time period T3 along with the next data value 2106.

An extended multiblock duration is defined as a programmable number of blocks (E blocks). The error detecting code also includes an extended multiblock boundary which is needed by the transport layer to properly demap the data. In addition, in some implementations, the block and multiblock boundaries happen relative to this extended multiblock boundary which is aligned to external pin SYSREF for ensuring deterministic latency between the transmitter and the receiver. The extended multiblock counter 2028 is used to generate and track the extended multiblock boundary.

Figure 22:
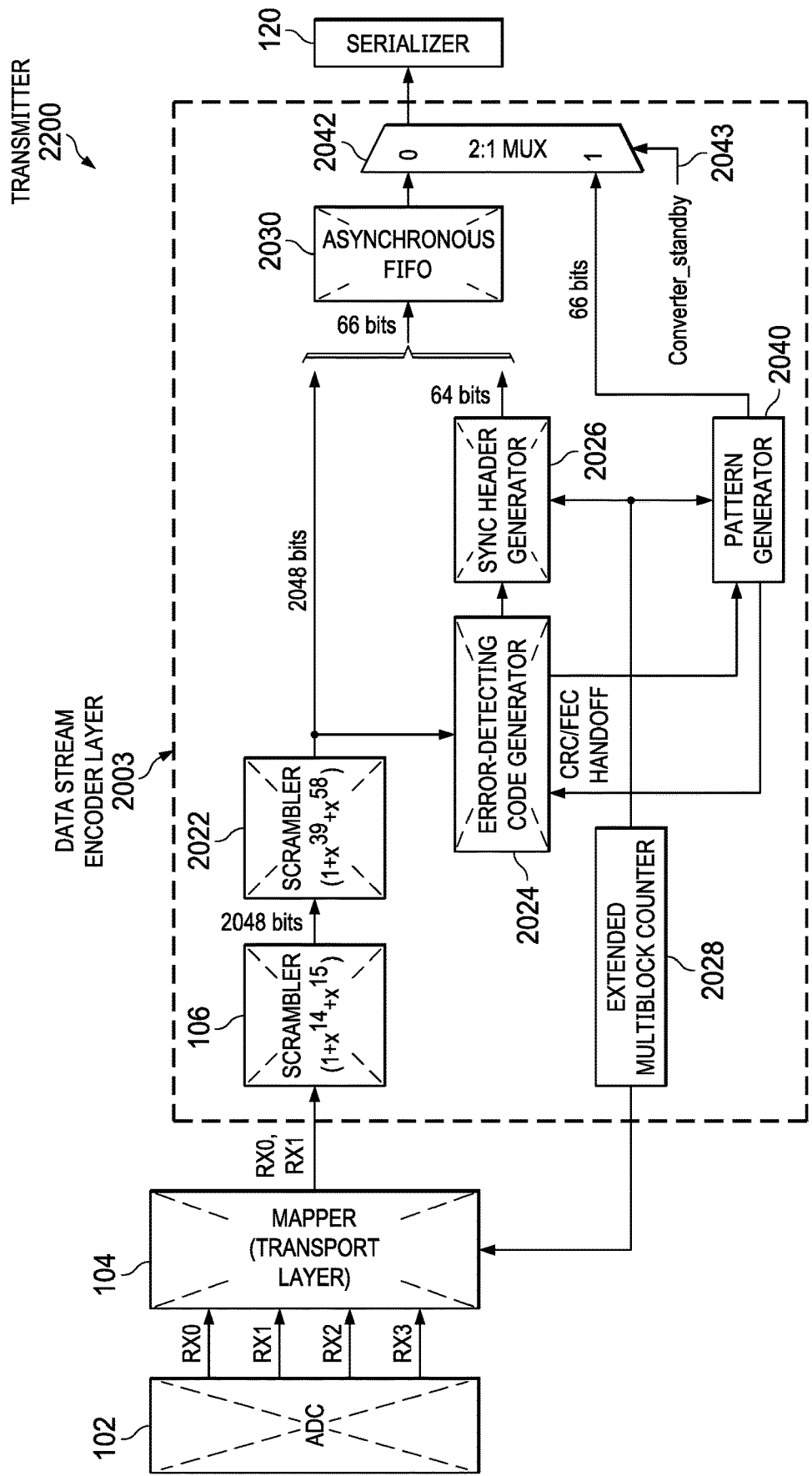
FIG. 22 shows another example of a JESD204C transmitter including a pattern generator.

FIG. 22 shows illustrates an example transmitter 2200 similar to that of FIG. 20 but with the inclusion of a pattern generator 2040 and a multiplexer 2042. The multiplexer 2042 has a 0-input that is coupled to the output of the asynchronous FIFO buffer 2030, and a 1-input that is coupled to an output of the pattern generator 2040. The transmitter can implement an active mode and a standby mode. While in the active mode, data from the ADC 102 is processed through the data stream encoder layer and transmitted to the receiver. While in the standby mode, at least some components of the data stream encoder layer are powered down to save power. While in the standby mode, the pattern generator 2040 is activated. The pattern generator 2040 outputs bit patterns that comport with the protocol otherwise implemented by the transmitter (JESD20C in this example). By continuing to provide protocol-compliant data from the transmitter, the communication link between transmitter and receiver remains active and fault-free (e.g., no decoding errors and no running disparity errors).

The pattern generator 2040 generates 66-bit bit patterns during the standby mode of the transmitter when at least some of the transmitter 2200 is powered down. The components powered down during the standby mode may include (as indicated by the dashed X's) the ADC 102, the mapper 104, and at least some of the data stream encoder layer 2003 such as the scramblers 106 and 2022, the error-detecting code generator 2022, the sync header generator 2026, and the asynchronous FIFO buffer 2030. Just before or as the transmitter enters the standby mode, the error-detecting code generator 2024 sends its current error code to the pattern generator 2040.

The pattern generator 2040 then generates a 2048b data pattern and begins to output the 2048-bit bit pattern and the 64-bit error code from the error-detecting code generator 2024 to the multiplexer 2042 in the form of 32, 66-bit values. Each 66-bit value includes 64 bits of the 2048-bit pattern generated by the pattern generator and 2 bits of the error code from the error-detecting code generator. After the 2048-bit bit pattern generated by the pattern generator 2040 and the 64-bit error code from the error-detecting code generator 2024 are transmitted to through the multiplexer 2042 and serializer 120 to the receiver, the pattern generator 2040 generates the next 2048-bit pattern and also generates a corresponding error code (rather than use an error code from the error-detecting code generator 2024).

The pattern generator 2040 continues generating 2048-bit patterns and corresponding 64-bit error codes until the transmitter 2200 exits the standby mode back to the active mode. The transition from the standby to the active also includes an exchange of the error code between the pattern generator 2040 and the error-generating code generator 2024. The most recently computed error code by the pattern generator 2040 is provided by the pattern generator to the error-detecting code generator 2024 as a control parameter. The first combination of 2048 bits of data and 64 bits of error code while the transmitter is in the active mode includes data produced by ADC 102, but the error code last produced by the pattern generator 2040. For each subsequent ADC sample (2048 bits), the error-detecting code generator 2024 generates the corresponding error code (instead of using an error code form the pattern generator 2040. Also, upon re-entry into the active mode, the previously powered down components are powered up.

Figure 23:
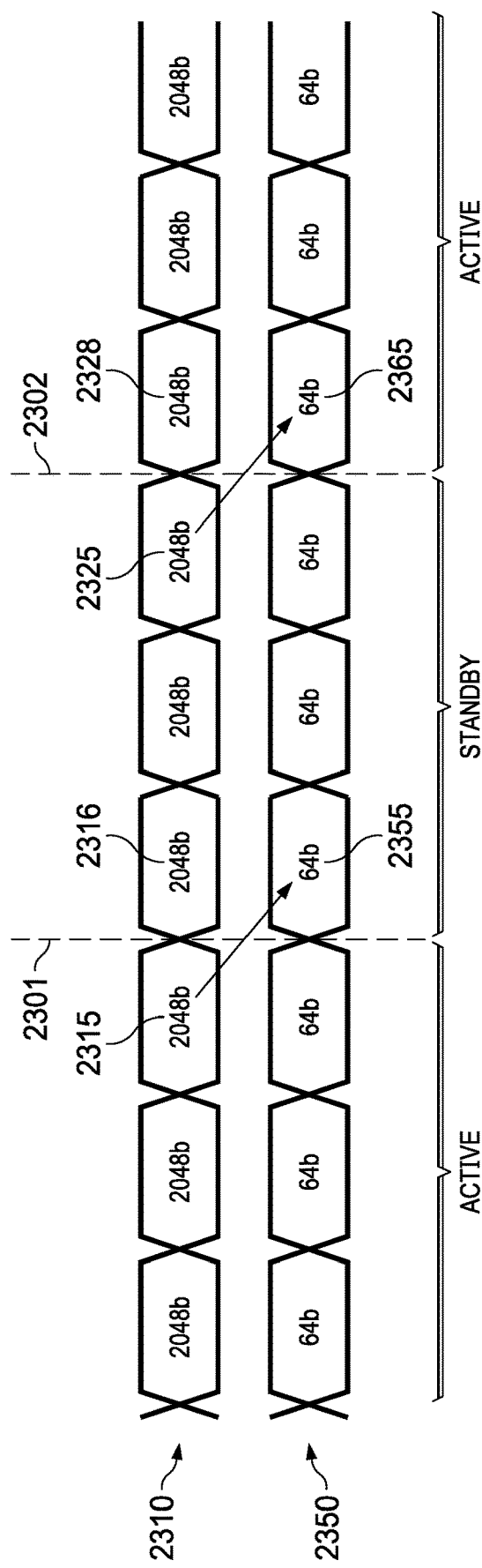
FIG. 23 illustrates the communication of error codes to/from the pattern generator of FIG. 22.

The above-described transition from the active mode to the standby mode and back to the active mode is illustrated in FIG. 23. Line 2301 demarcates the transition from the active mode to the standby mode, and line 2302 demarcates the transition from the standby mode to the active mode. Reference numeral 2310 indicates data (2048 bits) and reference numeral 2350 indicates error codes to be transmitted with the data.

Upon transition into the standby mode at 2301, the data value 2316 and error code 2355 are serialized as described above. Data value 2316 is generated by pattern generator 2040 and error code 2355 is generated by error-detecting code generator 2024 just before the error-detecting code generator was powered down. The error code 2355 was computed by the error-detecting code generator 2024 based on data value 2315 (which originated from ADC 102). Upon entry back into the active mode (2302), the first data value/error code pair includes data value 2328 produced by the ADC 102 and error code 2365 produced by the pattern generator 2040 based on data value 2325 which also was produced by the pattern generator.

Figure 24:
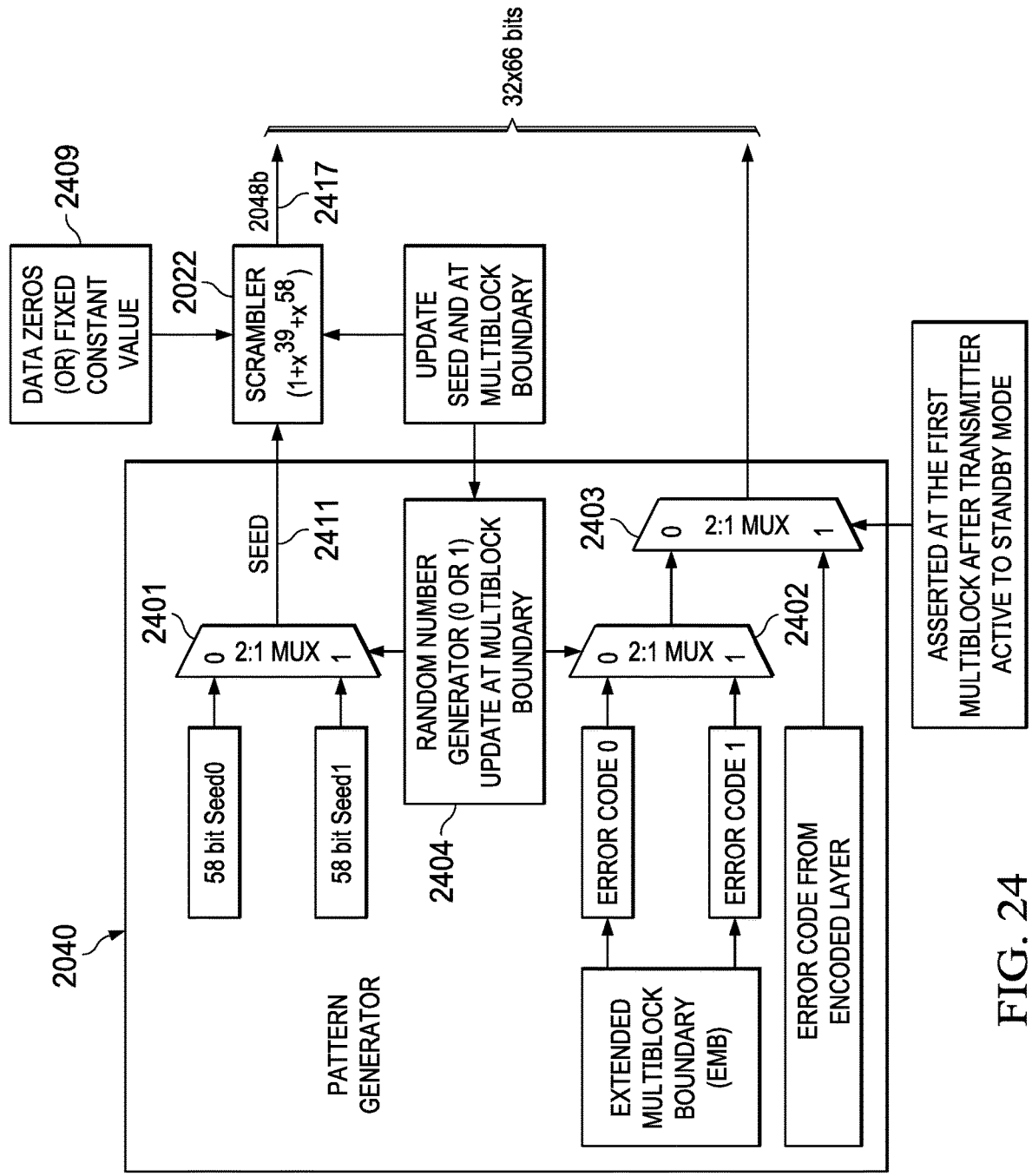
FIG. 24 shows an example implementation of the pattern generator of FIG. 22.

FIG. 24 illustrates an example implementation of the pattern generator 2040. In this example, the pattern generator 2040 includes multiplexers 2401-2403 and a random number generator 2404. The random number generator 2404 may be implemented in the same manner as random number generator 1102 described above. The scrambler 2022 is also shown in FIG. 24. Scrambler 2022 receives an input value 2409 and a seed value 2411. Input to the scramblers in pattern generator is all 0's or a fixed constant value in FIG. 24 as shown at 2409.

The inputs to multiplexer 2401 are two preset seed values (Seed0 and Seed1). In one example, the seed values are 58-bit values. The random number generator 2404 generates a 0 or a 1 to select either the 0-input (Seed0) or the 1-input (Seed1) of multiplexer 2401 as the seed value to provide to scrambler 2022. The seed value 2411 to scrambler 2022 is updated every, for example, 2048 bits. The output value 2417 from scrambler 2022 is a sequence of 2048 bits. Because the input value 2409 is fixed (e.g., all 0's) and the seed value 2411 is one of two values in this example, the output value 2417 is either a first sequence of 2048 bits or a second sequence of 2048 bits. As such, the output value 2417 from scrambler 2022 is known based on the random number generator 2404 output bit.

The 0-input of multiplexer 2402 is a first precomputed error code (precomputed error code 0) and the 1-input of multiplexer 2402 is a second precomputed error code (precomputed error code 1). Precomputed error code 0 is an error code that has been computed for the scrambler's output value 2417 based on the use of Seed0. Similarly, precomputed error code 1 is an error code that has been computed for the scrambler's output value 2417 based on the use of Seed1. The current output from random number generator 2404 controls multiplexer 2401, whereas the previous output from the random number generator controls multiplexer 2402. If the random number generator output is a 0, then multiplexer 2041 is controlled to select the 0 input and thus Seed0 is selected to produce the next 2048-bit bit pattern and if the random number generator output is a 1, then multiplexer 2041 is controlled to select the 1 input and thus Seed 1 is selected to produce the next 2048-bit bit pattern. If the previous random number generator output is a 0, then multiplexer 2042 is controlled to select the 0 input and thus Error Code 0 (which corresponding to the previous 2048-bit bit pattern) is selected to produce the next error code and if the previous random number generator output is a 1, then multiplexer 2042 is controlled to select the 1 input and thus Error Code 1 (which corresponds to the previous 2048-bit bit pattern) is selected to produce the next error code. Multiplexer 2403 is included to control whether a precomputed error code from multiplexer 2402 is selected or whether the error code from the error-detecting code generator 2024 is selected, as explained above regarding the transitions between the active and standby modes. The error code selection is based on the seed that is selected in the previous multiblock i.e. 2048 bits. For example, if the sequence of seeds is seed0, seed0, seed1, seed0, then the sequence of error codes will be error-code0/1, error-code0, error-code0, error-code1

In FIG. 22, because the pattern generator 2040 does not know the last ADC value that was transmitted before transition to the standby mode, the pattern generator also does not know the error code that was computed for that particular ADC value. Consequently, in FIG. 22, a communication of the error-detecting code generator's last computed error code occurs between the error-detecting code generator and the pattern generator 2040 so that the pattern generator can use the correct error code as described above. Similarly, the pattern generator generated error code is communicated to the error-detecting code generator upon transition back to the active mode.

Figure 25:
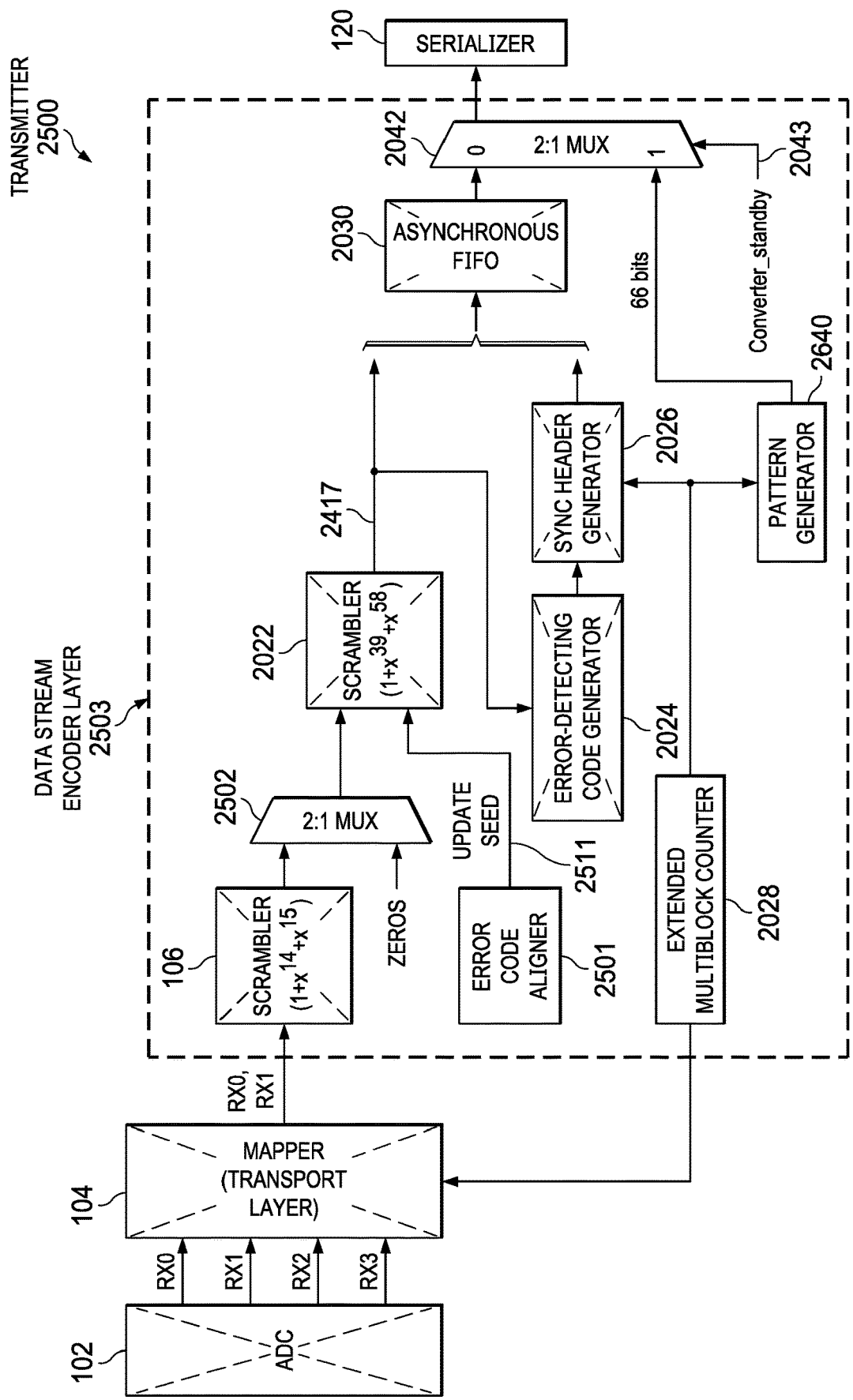
FIG. 25 illustrates the use of an error code aligner.

FIG. 25 illustrates a transmitter 2500 which avoids the communication of the error codes between the error-detecting code generator 2024 and pattern generator 2040. The example of FIG. 25 is similar to that of FIG. 22 but includes an error code aligner 2501 and multiplexer 2502. Pattern generator 2640 may be implemented differently than pattern generator 2040 of FIG. 22 (as explained below). The data stream encoder layer thus is different than in preceding examples and is designated data stream encoder layer 2703. The output of scrambler 106 is coupled to one input of multiplexer 2501 and the other multiplexer input receives a predefined seed value (e.g., all 0's). The error code aligner 2501 uses the same random number from random number generator 2404 as is used for the pattern generator 2040.

When a determination is made that the transmitter 2500 should enter the standby mode, the error code aligner 2501 is activated to produce a seed value 2511 through multiplexer 2502 to scrambler 2022. The seed value 2511 produced by the error code aligner 2501 is one of multiple (e.g., two) values selected based on the random number from random number generator 2404. As such, the scrambler's output value 2417 is set based on the seed value 2511. Because the pattern generator 2040 uses the same random number that the error code aligner 2501 used to produce the seed value 2511, the pattern generator 2404 can generate an error code using either precomputed error code 0 or precomputed error code 1 (FIG. 24) that is an error code for the seed value produced by the error code aligner. The error code aligner 2501 also uses the same random number as the pattern generator upon transition back to the active mode. As such, no communication of error codes between error-detecting code generator 2024 and pattern generator 2040 is needed.

In a multi-lane configuration, the multiple lanes may share pattern generator 2040 and the error code aligner 2501. Thus, the same seed value 2511 is provided to the scramblers of all of the lanes so that one pattern generator 2040 can be used instead of requiring separate pattern generators for each serial lane.

Figure 26:
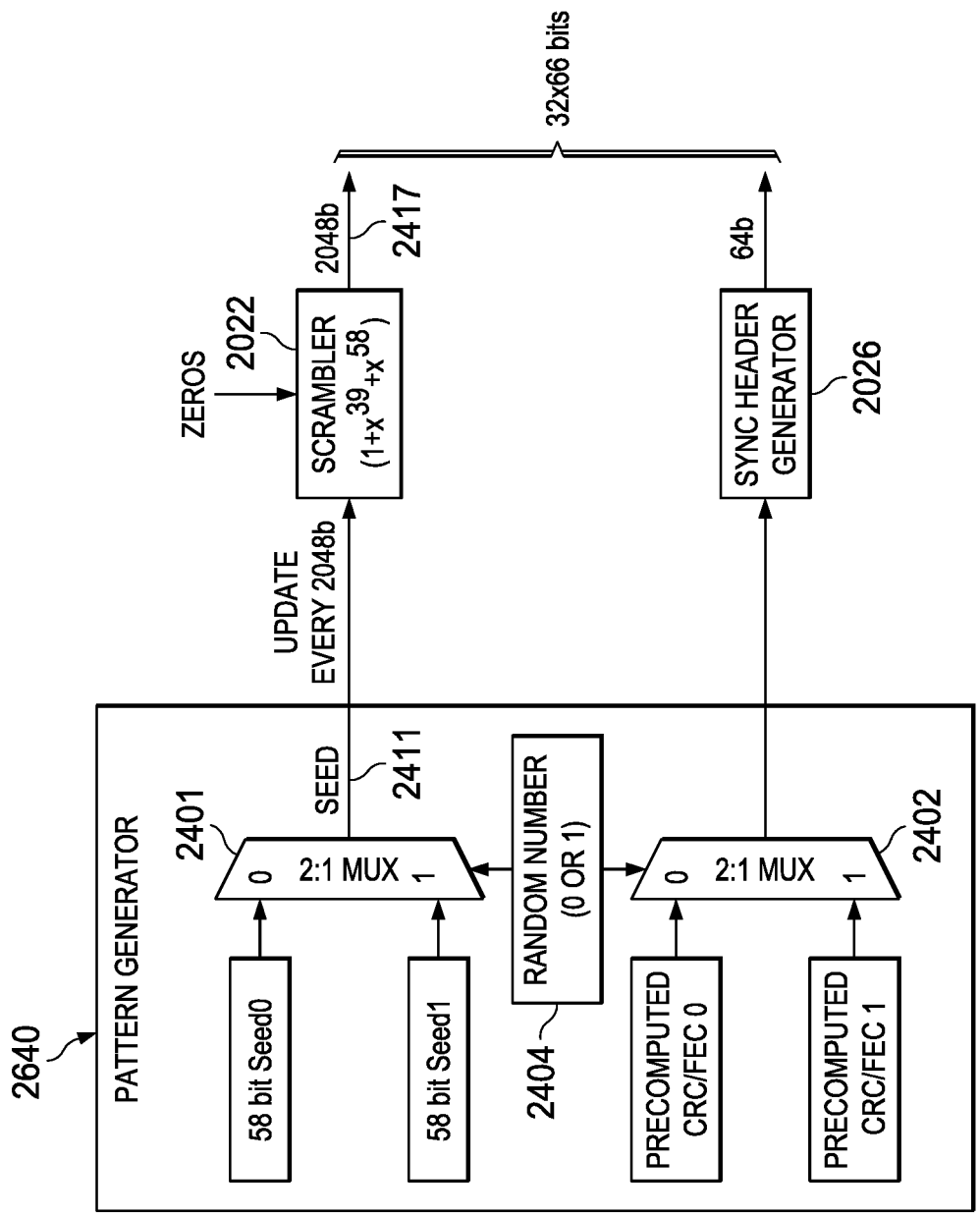
FIG. 26 shows another example of the pattern generator of FIG. 22 for a transmitter that includes an error code aligner.

FIG. 26 shows another implementation for the pattern generator. In FIG. 26, the pattern generator is designated as pattern generator 2640. The implementation of pattern generator 2640 is similar to that of pattern generator 2040 except that multiplexer 2403 is not present in pattern generator 2640. Multiplexer 2403 was included in FIG. 24 to permit the error code communicated to the pattern generator 2040 from the error-detecting code generator 2024 to be used. In the example of FIGS. 25 and 26 because no communication occurs of error codes between the error-detecting code generator 2024 and the pattern generator 2640, multiplexer 2403 is not needed and thus not included.

Figure 27:
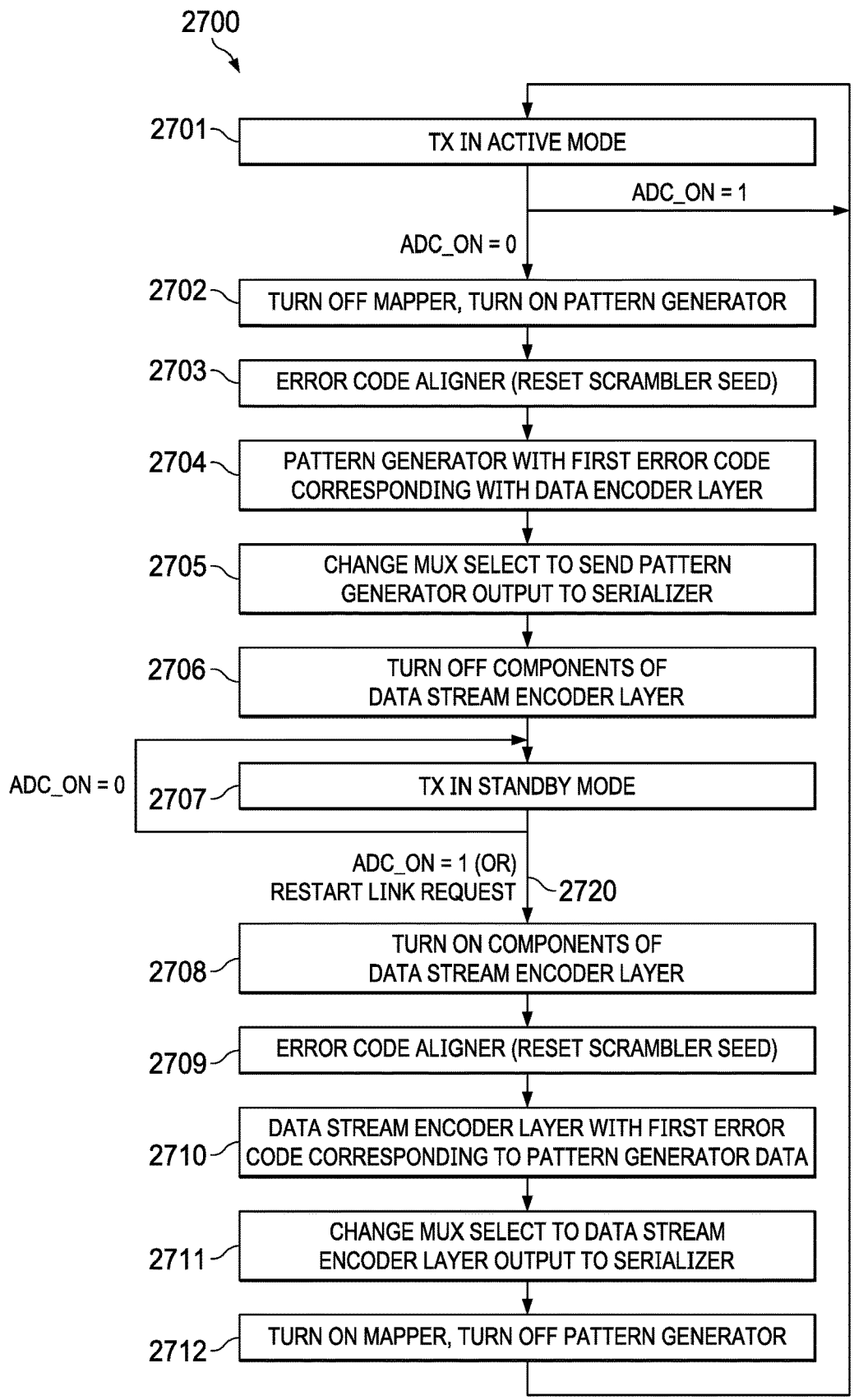
FIG. 27 shows a flow chart for the transmitter of FIG. 25.

FIG. 27 illustrates a flowchart 2700 of the sequence of steps in transitioning the transmitter 2500 from the active mode to the standby mode and back to the active mode. Starting at 2701, the transmitter 2500 is in the active mode. As explained above, the flag ADC_ON indicates whether the transmitter is to be in the active mode (RX_ON=1) or in the standby mode (ADC_ON=0). When ADC_ON is set to 0, the mapper 104 is turned off at 2702. The ADC 102 also is turned off. At 2703, the error code aligner 2501 aligns the serial lanes as described above.

At 2704, the pattern generator generates bit patterns with the first error detecting code generated matches with the error detecting code generator of the encoder layer. Subsequent bit patterns and error codes from the pattern generator is as described above. At 2705, the state of multiplexer 2042 is changed so as to provide the bit sequences from the pattern generator 2640 to the respective serializer (e.g., serializer 120). At 2706, additional components within the data stream encoder layer 2503 are powered down (e.g., any or all of scramblers 106 and 2022, error-detecting code generator 2024, sync header generator 2026, and asynchronous FIFO buffer 2030). At 2707, the data stream encoder layer 2503 is in the standby mode with valid bit patterns transmitted from the pattern generator 2640 across the link to the receiver to maintain the link active.

At 2720, the ADC_ON flag is set to 1 to indicate that the transmitter should transition from the standby mode back to the active mode. At 2708, the previously powered down components of the data stream encoder layer 2503 are powered on. At 2709, the error code aligner 2501 aligns the serial lanes(s) using the same seed value as used by the pattern generator. At 2710, the error detecting code generator of the data stream encoder layer generates bit patterns with the first error detecting code matches with error detecting code of the pattern generator. Subsequent bit patterns and error codes correspond to data from ADC is as described above. At 2711, the state of multiplexer 2042 is changed so as to provide the bit sequences from the respective asynchronous FIFO buffer (e.g., asynchronous FIFO buffer 2030) (and thus from ADC 102 after the mapper 104 is turned on) to the serializer 120. The mapper 104 (and ADC 102) is powered on at 2712, the pattern generator is powered down and the transmitter is fully back in the active mode at 1601.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A transmitter, comprising:
a data stream encoder layer having an output;
a pattern generator having a bit pattern output; and
a first multiplexer having first and second inputs and a first multiplexer output, the first input coupled to the output of the data stream encoder layer, and the second input coupled to the bit pattern output of the pattern generator;
wherein, while at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer;
wherein the data stream encoder layer provides an encoder state value to the pattern generator and the pattern generator uses the encoder state value provided by the data stream encoder layer to provide a bit pattern to the first multiplexer.

2. The transmitter of claim 1, wherein:
upon powering up the data stream encoder layer, the pattern generator is configured to provide its current encoder state value to the data stream encoder layer;
the control signal to the first multiplexer is configured to select the first input of the first multiplexer; and
the data stream encoder layer uses the pattern generator's current encoder state value to provide a bit pattern on the data stream encoder layer's output.

3. The transmitter of claim 1, wherein the encoder state value is a running disparity (RD) value.

4. A transmitter, comprising:
a data stream encoder layer having an output;
a pattern generator having a bit pattern output; and
a first multiplexer having first and second inputs and a first multiplexer output, the first input coupled to the output of the data stream encoder layer, and the second input coupled to the bit pattern output of the pattern generator;
wherein, while at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer;
wherein the pattern generator includes:
a second multiplexer having first and second inputs, a selection input, and an output, wherein a first bit pattern is coupled to the first input of the second multiplexer and a second bit pattern is coupled to the second input of the second multiplexer; and
a random number generator having an output coupled to the selection input of the second multiplexer.

5. A transmitter, comprising:
a data stream encoder layer having an output;
a pattern generator having a bit pattern output; and
a first multiplexer having first and second inputs and a first multiplexer output, the first input coupled to the output of the data stream encoder layer, and the second input coupled to the bit pattern output of the pattern generator;
wherein, while at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer;
wherein:
the data stream encoder layer is a first data stream encoder layer;
the transmitter includes a second data stream encoder layer; and
the pattern generator is configured to provide bit patterns for the first and second data stream encoder layers.

6. The transmitter of claim 5, wherein the transmitter implements encoder state values for the first and second data stream encoder layers, and the transmitter further comprises:
a second multiplexer having first and second inputs, a selection input, and an output;
a third multiplexer having first and second inputs, a selection input, and an output; and
an aligner having first and second aligner outputs, the first aligner output coupled to the selection input of the second multiplexer, and the second aligner output coupled to the selection input of the third multiplexer, the aligner configured to force the encoder state values of the first and second data stream encoder layers to be the same.

7. A transmitter, comprising:
a data stream encoder layer having an output;
a pattern generator having a bit pattern output; and
a first multiplexer having first and second inputs and a first multiplexer output, the first input coupled to the output of the data stream encoder layer, and the second input coupled to the bit pattern output of the pattern generator;
wherein, while at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer;
wherein:
the data stream encoder layer includes an error-detecting code generator configured to calculate error-detecting codes for data to be transmitted by the transmitter;
the error-detecting code generator is configured to provide its current error-detecting code to the pattern generator upon transition of the data stream encoder layer to a standby mode; and
the pattern generator generates a first bit pattern on its bit pattern output using the current error-detecting code.

8. The transmitter of claim 7, wherein the pattern generator includes:
a second multiplexer having first and second inputs, a selection input, and an output, wherein the first bit pattern is coupled to the first input of the second multiplexer and a second bit pattern is coupled to the second input of the second multiplexer;
a third multiplexer having first and second inputs, a selection input, and an output, wherein error-detecting codes corresponding to the first and second bit patterns are provided to the first and second inputs of the third multiplexer; and a random number generator having an output coupled to the selection inputs of the second and third multiplexers.

9. The transmitter of claim 8, wherein the first and second bit patterns comprise seed values.

10. The transmitter of claim 7, wherein, during the standby mode of the data stream encoder layer, the pattern generator generates a second bit pattern on its bit pattern output, the second bit pattern includes an error-detecting code.

11. The transmitter of claim 10, wherein the data stream encoder layer includes a scrambler and, upon transition from the standby mode to an active mode of the data stream encoder layer, the pattern generator provides a third error-detecting code to the error-detecting code generator, and the data stream encoder layer generates a bit pattern on its output that includes the third error-detecting code and data from the scrambler.

12. The transmitter of claim 7, further including:
a first scrambler included in the data stream encoder layer having an input and an output, the output is coupled to the first input of the first multiplexer; and
an aligner having an input and an output, the aligner configured to provide a seed value to the first scrambler.

13. The transmitter of claim 12, wherein:
the data stream encoder layer is a first data stream encoder layer configured to implement a first data stream; and
the transmitter includes a second data stream encoder layer configured to implement a second data stream, the second data stream encoder layer including a scrambler;
the aligner is configured to provide the same seed value to the scramblers of the first and second data stream encoder layers; and
the pattern generator is configured to provide bit patterns to the first and second data stream encoder layers.

14. A transmitter, comprising:
a data stream encoder layer having an output;
a pattern generator having a bit pattern output, the pattern generator including a random number generator, and the pattern generator is configured to provide bit patterns on its bit pattern output based, at least in part, on a random number produced by the random number generator; and
a first multiplexer having first and second inputs and a first multiplexer output, the first input coupled to the output of the data stream encoder layer, and the second input coupled to the bit pattern output of the pattern generator;
wherein, while at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer;
wherein the data stream encoder layer provides an encoder state value to the pattern generator and the pattern generator uses the encoder state value provided by the data stream encoder layer to provide a bit pattern to the first multiplexer.

15. A transmitter, comprising:
a data stream encoder layer having an output;
a pattern generator having a bit pattern output, the pattern generator including a random number generator, and the pattern generator is configured to provide bit patterns on its bit pattern output based, at least in part, on a random number produced by the random number generator; and
a first multiplexer having first and second inputs and a first multiplexer output, the first input coupled to the output of the data stream encoder layer, and the second input coupled to the bit pattern output of the pattern generator;
wherein, while at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer;
wherein the pattern generator includes:
a second multiplexer having first and second inputs, a selection input, and an output, wherein a first bit pattern is coupled to the first input of the second multiplexer and a second bit pattern is coupled to the second input of the second multiplexer; and
the random number generator has an output coupled to the selection input of the second multiplexer.

16. The transmitter of claim 15, wherein:
the first bit pattern includes a first bit and a last bit;
the second bit pattern includes a first bit and a last bit; and
the first bit of the first bit pattern matches the last bit of the second bit pattern, and the last bit of the first bit pattern matches the first bit of the second bit pattern.

17. A transmitter, comprising:
a data stream encoder layer having an output;
a pattern generator having a bit pattern output, the pattern generator including a random number generator, and the pattern generator is configured to provide bit patterns on its bit pattern output based, at least in part, on a random number produced by the random number generator; and
a first multiplexer having first and second inputs and a first multiplexer output, the first input coupled to the output of the data stream encoder layer, and the second input coupled to the bit pattern output of the pattern generator;
wherein, while at least a portion of the data stream encoder layer is powered down, the pattern generator is configured to provide bit patterns on its bit pattern output, a control signal to the first multiplexer is configured to select the second input of the first multiplexer, and the first multiplexer is configured to output the bit patterns on the output of the first multiplexer;
wherein:
the data stream encoder layer includes an error-detecting code generator configured to calculate error-detecting codes for data to be transmitted by the transmitter;
the error-detecting code generator is configured to provide its current error-detecting code to the pattern generator upon transition of the data stream encoder layer to a standby mode; and
the pattern generator generates a first bit pattern on its bit pattern output using the current error-detecting code.

18. A method, comprising:
activating a pattern generator;
providing a first control parameter from a data stream encoder layer of a transmitter to the pattern generator;
powering down the transmitter's data stream encoder layer;

generating, by the pattern generator, a first bit pattern based, at least in part, on by the first control parameter provided from the data stream encoder layer; and providing the first bit pattern from the pattern generator through a serializer of the transmitter while the transmitter's data stream encoder layer is in a standby mode.

19. The method of claim 18, wherein providing the first control parameter includes providing a running disparity (RD) value.

20. The method of claim 18, wherein providing the first control parameter includes providing an error-detecting code.

21. The method of claim 18, further comprising:
upon initiating a transition of the data stream encoder layer from the standby mode to an active mode, providing a second control parameter from the pattern generator to the data stream encoder layer;
generating output data, by the data stream encoder layer, based, at least in part, on the second control parameter from the pattern generator; and
providing the output data from the data stream encoder layer to the transmitter while the transmitter's data stream encoder layer is in the active mode.

22. The method of claim 21, wherein the second control parameter is a running disparity (RD) value or an error-detecting code.

23. The method of claim 18, wherein the transmitter implements first and second data stream encoder layers, and the method further includes providing the first bit pattern from the pattern generator to the first and second data stream encoder layers while the first and second data stream encoder layers are in the standby mode.

24. The method of claim 23, further comprising, upon transitioning the first and second data stream encoder layers from an active mode to a standby mode, the method includes forcing encoder states of the first and second data stream encoder layers to a same state.

25. The method of claim 23, further comprising, upon transitioning the first and second data stream encoder layers from an active mode to a standby mode, the method includes providing an error code from an error-detecting code generator to the pattern generator.

\* \* \* \* \*